United States Patent
Watanabe et al.

(10) Patent No.: US 6,632,116 B2
(45) Date of Patent: Oct. 14, 2003

(54) PLASMA DISPLAY PANEL, MANUFACTURING METHOD AND MANUFACTURING APPARATUS OF THE SAME

(75) Inventors: Eizaburo Watanabe, Tokyo (JP); Naoto Ohno, Tokyo (JP); Katsumi Ohira, Tokyo (JP); Junichi Arai, Tokyo (JP); Isao Kato, Tokyo (JP); Yasumasa Akimoto, Tokyo (JP); Ikuma Nishimura, Tokyo (JP); Takao Minato, Tokyo (JP); Ryuichi Nakamura, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/925,648

(22) Filed: Aug. 10, 2001

(65) Prior Publication Data

US 2002/0017864 A1 Feb. 14, 2002

Related U.S. Application Data

(63) Continuation of application No. PCT/JP00/00760, filed on Feb. 10, 2000.

(30) Foreign Application Priority Data

| Feb. 12, 1999 | (JP) | 11-033932 |
| Nov. 9, 1999 | (JP) | 11-318127 |
| Nov. 10, 1999 | (JP) | 11-319687 |

(51) Int. Cl.$^7$ .................................................. H01J 9/24
(52) U.S. Cl. ................................... 445/24; 313/586
(58) Field of Search .............................. 445/24; 313/586

(56) References Cited

U.S. PATENT DOCUMENTS

| 5,804,920 A | * | 9/1998 | Khan et al. | 313/584 |
| 5,853,446 A | | 12/1998 | Carre et al. | |
| 5,992,320 A | * | 11/1999 | Kosaka et al. | 313/582 |
| 6,140,759 A | * | 10/2000 | Sreeram et al. | 313/586 |
| 6,199,404 B1 | * | 3/2001 | Kawai et al. | 65/102 |
| 6,373,190 B1 | * | 4/2002 | Tsuruoka et al. | 313/586 |
| 6,373,191 B1 | * | 4/2002 | Jang et al. | 313/586 |

FOREIGN PATENT DOCUMENTS

| JP | 61-24126 | | 2/1986 | |
| JP | 2-242548 | | 9/1990 | |
| JP | 3-264857 | | 11/1991 | |
| JP | 8-153470 | | 6/1996 | |
| JP | 9-134676 | | 5/1997 | |
| JP | 9-147754 | | 6/1997 | |
| JP | 9-161683 | | 6/1997 | |
| JP | 9251158 | | 9/1997 | |
| JP | 10-21839 | | 1/1998 | |
| JP | 10-49060 | | 2/1998 | |
| JP | 10-144207 | | 5/1998 | |
| JP | 4-10-188793 | * | 7/1998 | 445/24 |
| JP | 10-269938 | | 10/1998 | |
| JP | 10-312754 | | 11/1998 | |
| JP | 10-321147 | | 12/1998 | |
| JP | 10-326560 | | 12/1998 | |
| JP | 11-204040 | | 7/1999 | |
| WO | WO 97-26641 | | 7/1997 | |

* cited by examiner

Primary Examiner—Kenneth J. Ramsey

(57) ABSTRACT

A method of manufacturing a plasma display panel, which comprises the steps of filling a barrier rib-forming paste containing glass frit in a barrier ribs-forming intaglio and concurrently forming a paste layer having a constant thickness on the intaglio, superimposing a substrate on the barrier ribs-forming intaglio filled with the barrier rib-forming paste containing glass frit to thereby transfer the barrier rib-forming paste onto the substrate, and heating the barrier rib-forming paste that has been transferred to the substrate, thereby burning out existing organic components and concurrently sintering the glass frit to thereby form the barrier ribs and dielectric layer. The plasma display panel manufactured by this method is featured in that the barrier ribs and the dielectric layer are formed using the same barrier rib-forming material containing a low melting point glass frit.

9 Claims, 14 Drawing Sheets

D ≧ d

D ≧ d

D ≧ d

PLASMA DISPLAY PANEL, MANUFACTURING METHOD AND MANUFACTURING APPARATUS OF THE SAME

CROSS REFERENCE TO RELATED APPLICATIONS

This is a Continuation Application of PCT Application No. PCT/JP00/00760, filed Feb. 10, 2000, which was not published under PCT Article 21(2) in English.

BACKGROUND OF THE INVENTION

This application is based upon and claims the benefit of priority from the prior Japanese Patent Applications No. 11-033932, filed Feb. 12, 1999; No. 11-318127, filed Nov. 9, 1999; and No. 11-319687, filed Nov. 10, 1999, the entire contents of all of which are incorporated herein by reference.

1. Field of the Invention

The present invention relates to a plasma display panel, and to the method and apparatus for manufacturing the plasma display panel. In particular, the present invention relates to a plasma display panel which is provided with barrier ribs for partitioning the discharge region of the plasma display panel, and to the method and apparatus for manufacturing such a plasma display panel.

2. Description of the Related Art

Conventionally, a CRT has been extensively employed as an image display device. However, the CRT is defective in the respects that it is large in overall size and weight, and that it requires a high voltage. Under the circumstances, a flat type image display device such as a light emitting diode (LED), a liquid crystal display device (LCD), a plasma display panel (PDP), a plasma addressed liquid crystal display (PALC), etc. has been developed in recent years, and these devices are now increasingly utilized.

Among them, due to the propagation of multimedia, the plasma display panel which is adapted to be employed as an interface of information in a color display device of large image area is now noticed as promising because the structure thereof where the emission of plasma is utilized is simple, it is suited for achieving a large image area and an excellent image quality, it is light in weight, and it is thin-walled so that it is free from restriction regarding the installation place thereof.

This plasma display panel comprises discharge display cells having minute spaces which are encircled by barrier ribs partitioning a space formed between a pair of flat insulating substrates, wherein each of the discharge display cells is provided therein with a pair of discharge electrodes and an address electrode which is disposed at the bottom of the discharge display cell. The minute spaces of the discharge display cells are formed of an air-tight structure filled therein with a dischargeable gas such as a rare gas, thereby enabling a plasma to be generated in the spaces through the discharging between the discharge electrodes and the address electrode, wherein the switching of light emission of the discharge display cells is effected by the address electrode.

The plasma can be generated by selectively applying a voltage between facing discharge electrodes, and vacuum ultraviolet rays released from the plasma are utilized for generating light from the phosphors formed within the discharge display cells, thereby making it possible to utilize the discharge display cells as the light-emitting elements of image display device.

Therefore, it is required, for the performing the aforementioned switching, to apply a voltage between the discharge electrodes. However, if the electrostatic capacity of the discharge display cell is large, the driving current between the discharge electrodes is rendered to be increased. As a result, the power consumption of the plasma display panel is required to be increased, thereby raising a problem that the power source equipment of the plasma display panel is required to be enlarged.

Further, although the plasma display panel constructed as described above is simple in structure, and suited for enhancing the fineness of image, each of the electrodes and phosphors disposed inside the discharge display cells is permitted to be exposed directly to the plasma being generated. As a result, due to the sputtering effect of the plasma, the surfaces of these electrodes and phosphors are deteriorated, thereby raising a problem that the light emission efficiency of the display panel is liable to be decreased.

With a view to overcome these problems, there has been proposed a plasma display panel wherein a dielectric layer is formed on the opposing electrodes disposed inside the discharge display cell to thereby protect the surface of each electrode with this dielectric layer, thereby making it possible to reduce the electrostatic capacity of the discharge display cell and to prevent the electrodes and phosphors from being deteriorated by the plasma generated (Jpn. Pat. Appln. KOKAI No. H8-77930; and Jpn. Pat. Appln. KOKAI No. H7-57630).

As for the method of forming a dielectric layer of uniform thickness on the address electrodes of discharge display cell, there is generally known a method wherein a dielectric paste is printed, and the uniformity of thickness and the flatness of the printed layer are enabled to be achieved through the leveling effect of the surface of printed paste.

However, even if a dielectric paste of low fluidity is employed, with a view to ensure a uniform thickness and flatness of a dielectric layer, for forming a dielectric layer having a thickness of about 5 $\mu$m on an electrode pattern ordinarily having a thickness of about 10 $\mu$m, the surface of the dielectric layer to be obtained would become wavy due to the recessed and projected surface constituted by regions where the electrode pattern is existed and regions where the electrode pattern is not existed, thereby making it difficult to obtain a dielectric layer which is uniform in thickness.

On the other hand, if a dielectric paste having a high leveling property, i.e. excellent in fluidity is employed with a view to ensure the flatness of dielectric layer, it would become difficult to secure a sufficient thickness of the dielectric layer as it is formed on the address electrode, thereby possibly permitting part of the address electrode to be exposed to the outside. Thus, the thickness of the dielectric layer would become non-uniform, thus making it very difficult to obtain a dielectric layer which is uniform in thickness and excellent in flatness.

Therefore, since the thickness or flatness of the dielectric layer formed on the surface of address electrode becomes non-uniform as mentioned above, the quantity of electric charge to be stored in the dielectric layer is caused to differ depending on the regions thereof. As a result, a voltage for controlling the emission of light is caused to differ for each of the discharge display cells depending on the location thereof, thereby raising a problem that it is impossible for the address electrode disposed between the barrier ribs to display a stable and accurate light emission.

Furthermore, the forming of the dielectric layer by means of printing method leads to an increase in number of steps by one additional step in the manufacture of the back plate of plasma display panel. Furthermore, since the material for forming the barrier rib differs from the material for forming the dielectric layer, there is a room for improvement not only in terms of productivity but also in terms of material cost.

There has been also proposed, as a method of forming the barrier rib integral with the dielectric layer, a press molding method wherein the material for forming the barrier rib is press-molded by making use of an intaglio having a pattern of the barrier ribs. Although it is required, in this case, to control the thickness of the dielectric layer through the adjustment of gap between the intaglio and the substrate, the provision of the gap makes it difficult to obtain a sufficient pressing pressure, and still more, it is difficult to precisely fit the barrier rib-forming material into the aforementioned intaglio of barrier rib-like configuration.

Additionally, the provision, in advance, of the thickness-wise configuration of the dielectric layer in the intaglio is difficult in the aspect of working the intaglio. Further, if there is a wavy portion in thickness-wise in the glass substrate or any non-uniformity in the pressing pressure to the intaglio, it becomes difficult to make constant the gap between the intaglio and the substrate, thus failing to obtain the dielectric layer having a uniform thickness.

The barrier ribs for constituting the discharge display cell are formed of an insulating material, e.g. an inorganic metal oxide, in general, which is bound by lead glass. As for the specific method of fabricating the barrier rib, there are known various method. At present however, the sand blast method is mainly employed (as for the conventional method of fabricating the barrier rib, see a monthly publication; Kameya, "LCD intelligence", August 1997, pp 57).

This sand blast method is featured in that a barrier rib-forming material is coated on a substrate to a predetermined thickness, and after predetermined regions of the coated layer which are desired to be left have been masked, sand is blasted onto the coated layer to thereby cut away redundant portions of the barrier rib-forming material, thereby forming a barrier rib.

Generally, barrier ribs, dielectric materials and electrodes, which are constituent elements for the discharge display cell, are formed on the back substrate.

According to the conventional manufacturing process, a back substrate as shown in FIG. 1 is manufactured by a sequence of steps, i.e. (1) a step of forming electrodes 2 on a glass substrate 1; (2) a step of forming a dielectric layer 3 on the surface of the electrodes 2; and (3) a step of forming barrier ribs 4 on the surface of the dielectric layer 3 (i.e. the electrodes 2→the dielectric layer 3→the barrier ribs 4).

Since each of these steps accompanies a substrate-sintering step, the dimension of the substrate is caused to vary on every occasions of these steps.

Therefore, when a strict dimensional accuracy is demanded for the purpose of enhancing the fineness of display cells, a problem is raised in the respect that the alignment between the electrodes and the barrier ribs becomes increasingly difficult due to the dimensional changes of substrate resulting from the sintering of the substrate.

Further, when the pitch of pixel becomes narrower, a defective such as short circuit between electrodes in the step of forming electrodes is liable to be generated, thus raising a problem.

By the way, although the barrier ribs are generally formed as an independent column, respectively, it is increasingly demanded to make the width of barrier rib narrower in order to increase the aperture ratio as the display is required to be further enhanced in fineness and in precision.

In this case, a problem is raised in that when the barrier ribs are formed into an independent column, respectively, the narrower the width of barrier rib becomes, the more it becomes likely that the barrier rib tends to fall down.

When it is desired to enhance the luminescence intensity of each pixel, it can be realized by enhancing the luminescence intensity of the phosphor itself. Alternatively, the light to be emitted from the phosphor may be reflected so as to increase the quantity of light to be emitted outside.

In order to realize this, it is preferable that the barrier rib to be formed on the back substrate is produced by making use of a white material which is excellent in reflectivity, and at the same time, a white dielectric material is formed also on the electrodes interposed between the barrier ribs, thereby enhancing the reflectivity of the substrate as high as possible.

Further, the thickness of the dielectric material should preferably be such that the permeation of visible light to the rear surface of substrate can be inhibited.

However, the thickness of the dielectric material will be restricted by the driving voltage, i.e. when the thickness of the dielectric material is increased, the driving voltage will be required to be proportionally increased. In view of this problem, the thickness of the dielectric material is in the range of 10 to 15 $\mu$m in general.

Accordingly, there is a problem that it is impossible, according to the plasma display that has been manufactured by making use of the aforementioned back substrate, to obtain a satisfactory brightness, because most of emitted light is permitted to permeate toward the rear surface of the back substrate.

On the other hand, as for the thin display apparatus of large image area, a 25-inch plasma addressed liquid crystal display is placed on the market, and a 42-inch plasma addressed liquid crystal display is also exhibited in an exhibition (S. Fukusue; "Manufacturing Process of PALC", a monthly publication, "FPD intelligence", vol. 6 (1998), pp 79–83).

In the manufacture of the plasma addressed liquid crystal display panel which is actually employed as described above, a process mainly utilizing a thick film printing method as disclosed in Jpn. Pat. Appln. KOKAI No. H4-265931 is adopted, thereby making it suited for the mass-production as well as for the production of panel having a large image area.

FIGS. 2 and 3 illustrate one example of this conventional plasma addressed liquid crystal display panel. As shown in FIGS. 2 and 3, after an anode 11 and cathode 12 are formed on the surface of a plasma substrate 10, barrier ribs 13 are formed on the substrate 10. Thereafter, the resultant body is sealed by making use of a dielectric thin glass plate 14 and by way of frit glass sealing. After this sealed body is evacuated, a discharge gas is introduced therein. After a CF layer 16 consisting of R, G and B, and a black stripe 17 are successively formed on a CF substrate 15, a signal electrode 18 is formed thereon. Then, the plasma substrate 10 and the CF-attached glass substrate 15 are arranged to oppose to each other with a spacer being interposed therebetween, and then, a liquid crystal 19 is further introduced thereinto. Finally, a polarizing plate 20 and a back light 21 are disposed in place to accomplish the fabrication of the plasma addressed liquid crystal display panel.

Next, the structure of the conventional plasma addressed liquid crystal display panel which is related to the present invention as well as the manufacturing method thereof will be explained with reference to FIG. 3 where the structure of the panel is shown and to FIG. 4 where the manufacturing steps of the panel are shown. By the way, in the case of a 42-inch plasma addressed liquid crystal display panel, the pitch of barrier ribs is set to 1.092 mm.

First of all, a low expansion coefficient glass substrate provided with an exhaust pipe-connecting hole is washed and dried. Then, by means of screen printing method, a Ni electrode paste is coated on the entire surface on the structure and then, dried to form a Ni electrode layer having a thickness of 50 $\mu$m. The Ni electrode paste in this case is mainly composed of a Ni metal powder, a low melting point glass, an antioxidant, a binder resin which is excellent in pyrolizability (ethyl cellulose, etc.), and a solvent for providing an excellent rheological property for screen printing (butyl acetate carbitol, $\alpha$-terpineol, etc.). Thereafter, a dry film (DF) is adhered onto the electrode layer, and patterned by way of exposure and development. Then, by means of sand blast method, redundant portions of the Ni electrode material are removed and the DF is peeled away. As a result, a stripe-shaped Ni electrode pattern corresponding to the anode and cathode for a discharging space is obtained. Further, since it is difficult to perform a vacuum sealing in this structure having the Ni electrode, a Ag electrode paste is further coated, by means of screen printing method, for use for the sealing portion and for the terminal electrode portion. By the way, for the purpose of preventing the generation of abnormal discharging at an end portion of plasma channel, a cover glass paste is coated by means of screen printing.

Thereafter, a barrier rib-forming paste for forming a barrier rib of plasma cell is repeatedly coated and dried several times by means of screen printing method until the resultant laminated structure becomes as high as about 250 $\mu$m in thickness, the resultant paste layer being subsequently baked. The barrier rib-forming paste in this case is mainly composed of a low melting point glass, a binder resin which is excellent in pyrolizability (ethyl cellulose, etc.), a solvent for providing an excellent rheological property for screen printing (butyl acetate carbitol, $\alpha$-terpineol, etc.), and a black pigment. By the way, the purpose for adding a black pigment to the barrier rib-forming paste is to make the barrier rib black in color after the sintering thereof and hence to prevent light from being reflected from the sidewall of barrier rib as explained below. Finally, the top portion of the barrier rib is polished so as to control the height of barrier rib to 200 $\mu$m±2 $\mu$m and to flatten the top surface of barrier rib. Thereafter, the barrier rib is fully washed so as not to leave any residual materials after the polishing. By the way, the dimension of the Ni electrode after the sintering of the barrier rib is about 40 $\mu$m in thickness and about 100 $\mu$m in width. Further, the resistance of the barrier rib with about 1000 mm of the discharge portion thereof is about 500 $\Omega$.

Since this Ni electrode is not formed of pure metal but formed of a glass cermet consisting of a metal and a low melting point glass frit, the electric resistance after sintering is at least 20 times as high as that of metal Ni. Therefore, the electrode cannot be made narrower in width and thinner in thickness. Since the width of the electrode cannot be made narrower, the aperture ratio cannot be reduced, thereby deteriorating the utilization efficiency of light emitted from the back light. Further, since the aperture ratio becomes 40% or less, it will become a decisive defect for the barrier ribs whose pitch is set to 0.485 mm as in the case of the 42-inch HDTV specification.

Further, since the thickness of the Ni electrode after the sintering thereof is set to about 40 $\mu$m, it will become difficult to uniformly laminate a dry film (DF) on the surface of the substrate. As a result, it becomes difficult to employ a paste-burying method wherein the height and configuration of the top of the barrier rib can be easily controlled by adjusting the thickness of the DF.

On the other hand, the method of forming the barrier rib by means of a sand blast method which has been proven to be useful for mass production in the method of forming the barrier rib of an AC type plasma display panel (PDP) is advantageous in that since the electrodes of plasma display panel are covered with a dielectric layer, the electrodes can be prevented from being damaged by the sand blast on the occasion of forming the barrier rib. However, since the electrodes are left exposed in the case of the PALC, the electrodes may be damaged by the sand blast, and hence this method is not so suited for use, and in fact, this method is not actually employed.

Under the circumstances, the screen printing method which is somewhat defective in terms of dimensional precision is compelled to be employed in the production of the barrier rib. In this case, if the pitch of the barrier ribs is set to 1.092 mm as in the case of the 42-inch VGA specification, a sufficient margin can be secured, thereby making it possible to form the barrier rib between electrodes. However, if the pitch of the barrier ribs is to be set to 0.485 mm as in the case of the 42-inch HDTV specification, an alignment precision within the range of ±10 $\mu$m is required, and hence this method is decisively defective in this respect.

As explained above, black barrier ribs are employed in the conventional structure of display panel. The purpose of providing the black barrier ribs is to suppress the influence of the deterioration of contrast that will be induced by the stray light which is reflected from the sidewall of the barrier rib. As a result, the light is shielded by the black barrier ribs and hence the aperture ratio is restricted, thus inviting a decisive defect that it is difficult to enhance the utilization efficiency of the backlight.

There is another problem that even if a liquid crystal of wide viewing angle mode is employed, the advantages thereof cannot be fully utilized due to so-called louver effects where the viewing angle is restricted in the direction perpendicular to the black barrier rib. With a view to overcome this problem, Jpn. Pat. Appln. KOKAI No. H11-212068 proposes a novel structure of plasma addressed liquid crystal display panel where the following measures are adopted.

Transparent barrier ribs are formed in place of the aforementioned black barrier ribs. It is possible, with this structure, to prevent the narrowing of viewing angle to be induced by the louver effects. When the transparent barrier ribs are formed of a material whose surface is relatively smooth, the deterioration of contrast due to the scattering of light can be suppressed. Further, if it is constructed such that the polarizing plate arranged close to the back glass substrate is disposed in such a manner that the direction of transmission axis thereof is oriented at an angle of 0 degree or 90 degrees to the direction of the transparent barrier rib; that the polarizing plate arranged close to the front glass substrate is disposed in such a manner that the direction of transmission axis thereof is oriented orthogonal to the transmission axis of the polarizing plate arranged close to the back glass substrate; and that the transparent barrier ribs are erected perpendicular to the back glass substrate, the rotation of light on polarization plane can be prevented on the occasion when the light passes through the transparent barrier rib.

It is said that as a result of the structure as mentioned above, it becomes possible to obtain a panel which is excellent in utilization efficiency of backlight, without deteriorating the contrast, and wide in viewing angle as compared with the conventional panel having the black barrier ribs.

However, this manufacturing method of the back glass substrate is substantially the same as the aforementioned method of manufacturing the barrier rib substrate of plasma addressed liquid crystal display by means of the conventional thick film printing method. Namely, this manufacturing method is simply featured in that a glass paste for forming a transparent barrier rib is substituted for the glass paste for forming a transparent barrier rib. Therefore, this manufacturing method is accompanied with the same decisive defect as mentioned above.

Further, as apparent from the aforementioned manufacturing technique of plasma display, the conventional method of forming the barrier rib through a repetition of the thick film printing method is accompanied with a problem that in what manner the rheological property of the barrier rib-forming paste is controlled, it is unrealistic, even if it may be possible in the level of laboratory, to vertically erect the barrier rib up to a height of as high as 250 μm on the surface of glass substrate. It is much less possible to uniformly erect vertical barrier ribs up to a height of as high as 250 μm on the surface of glass substrate of 42 inches in size. Additionally, it is difficult to take measures to a problem of stepped portions which may be formed on the sidewall of barrier rib due to the repetition of the printing procedure.

As mentioned above, there has been proposed, as a method of forming the barrier rib integral with the dielectric layer, a method of press-molding a material for the barrier rib by making use of an intaglio having a configuration of the barrier rib. This method of forming a projection pattern by making use of such an intaglio is accompanied with the following problems as explained below.

A first problem to be raised on the occasion of forming a projected pattern on a rigid substrate by making use of an intaglio is that since the intaglio is also formed of a rigid material, an insufficiently contacted portion may be generated at the interface between the intaglio and the rigid substrate. As a result, the transfer of ink from the intaglio to a printing matter (matter to be printed) this insufficiently contacted portion, thereby generating a defective portion indicating a transfer failure. Jpn. Pat. Appln. KOKAI No. H4-34551 discloses a method for overcoming this problem. This method is directed to the transfer of a pattern to a glass substrate, etc., wherein an ink-repellent elastic layer is formed all over the surface of the intaglio excluding the recessed portions thereof. At the time of printing, this elastic layer is deformed by the printing pressure, thereby enabling the elastic layer to be closely contacted with a rigid substrate such as a glass substrate which may be non-uniform in thickness or uneven in surface state, thus permitting ink to transfer from the intaglio to the substrate. As a result, a pattern which is minimal in defects is said to be obtained.

Though it may depend on the viscosity of ink, ink is caused to split at approximately half a depth of the intaglio at the transferring step thereof, so that a projected pattern to be obtained is of reduced thickness. Additionally, the configuration of the projected pattern thus obtained is also influenced by the splitting of ink.

Meantime, Jpn. Pat. Appln. KOKAI No. S57-87318 discloses a method for preventing the generation of the splitting of ink. Namely, this method is featured in that the ink (paste) to be employed therein is formed of an ultraviolet-curing composition or of an electron beam curing composition, and hence the ink held in the intaglio is preliminarily cured before it is transferred. It is also disclosed therein that for the purpose of enhancing the releasability of intaglio, silicone is applied to the interior of intaglio.

Further, Jpn. Pat. Appln. KOKAI No. H4-35989 discloses a method which seems to be a modification of the method disclosed in Jpn. Pat. Appln. KOKAI No. H4-34551. Namely, this method is featured in that the inner surface of the recessed portions is constituted by a releasable material such as silicone rubber or Teflon, thereby improving the transferability of ink. Therefore, if an adhesive layer is deposited in advance on the surface of a rigid printing matter such as a glass substrate, the transfer of ink can be performed after the curing of ink, thereby enabling to obtain a projected pattern exhibiting an excellent configuration.

However, there is a problem that since the inner surface of the recessed portions is constituted by an ink-repellent surface or by a releasable surface, the ink that has been once introduced into the recessed portions may be removed from the recessed portions and adhered to an inking roller, as the inking roller is separated away from the intaglio.

The technique disclosed in this Jpn. Pat. Appln. KOKAI No. H4-35989 is a modification of the printing plate and of the printing method disclosed in Jpn. Pat. Appln. KOKAI No. S56-137989. According to the latter publication, the surface of printing plate is not provided with an ink-repellent layer, but is constituted by a hard material such as a chrome plating layer or a stainless steel plate. In this case, even if the inner surface of the recessed portions is poor in conformability with ink, it has been possible to enable the inner surface of recessed portion of the hard layer to become compatible with ink and hence to perform the inking, provided that the inking is performed by making use of a doctor blade. Since the backing material is expandable, the backing material is capable of pushing out ink as it is pressed, so that the transfer of ink to the rigid substrate can be performed without raising any serious problem. Further, since the ink can be cured before it is discharged from the printing plate so as to shape the ink into a desired configuration, it has been possible to push out the resultant cured ink toward a printing matter as mentioned above. However, it has been impossible to apply an adhesive material to the surface of printing matter in the transfer of ink to the printing matter, because if an adhesive material applied to the surface of printing matter, the printing plate will be bonded to the printing matter.

If silicone resin or fluororesin is applied, for the purpose of avoiding the aforementioned problem, to the surface of printing plate so as to make the surface of printing plate releasable to ink or an adhesive material, there will be raised another problem that since these resins are soft, these resins are liable to be damaged on the occasion of scraping out ink by means of doctor blade, and hence the durability of the printing plate becomes poor.

Jpn. Pat. Appln. KOKAI Nos. H4-10936 and H5-241175 set forth a method for modifying the aforementioned inking method. Namely, this method is featured in that ink is pushed into the recessed portions by making use of a film exhibiting an excellent releasability. According to this method, irrespective of whether the ink in the recessed portions is cured or not, there is no possibility that the ink in the recessed portions is wiped out or taken up by the inking roll.

However, these Japanese Patent Publications simply set forth the methods of inking and curing, but nothing about the apparatus thereof. Further, there is another problem which may be raised on the occasion of inking to the recessed portions. Namely, the problem is the entrapment of air bubbles, which is more likely to occur as the depth of the recessed portions becomes deeper, the pattern becomes finer, the viscosity of ink becomes higher, and the filling speed becomes faster. The aforementioned Japanese Patent Publications however suggest nothing about these problems.

Next, the method of continuously manufacturing the barrier ribs of flat plasma display panel using a rotary type apparatus type will be explained. As for the prior art, Jpn. Pat. Appln. KOKAI Nos. H8-321258 and H10-101373 set forth a technique related to this.

The method disclosed in Jpn. Pat. Appln. KOKAI No. H8-321258 will be explained with reference to FIGS. 5 to 7, wherein the following two steps are essentially required.

(1) By making use of an intaglio 54 provided with recessed portions 71 for forming the barrier rib portions of plasma display panel, an ionizing radiation-curing resin 53 containing glass frit is filled at least in the recessed portions 71 of the intaglio 54, and at the same time, a film substrate 61 is permitted to contact with the intaglio 54, during which an ionizing radiation 51 is irradiated to the ionizing radiation-curable resin 53 which is kept interposed between the film substrate 61 and the intaglio 54 to thereby cure the resin 53, after which the film substrate 61 and the resin 53 are released away from the recessed portions 71.

(2) The surface of ionizing radiation-curable resin thus cured, having the configuration of barrier ribs and formed on the film substrate 61 is closely contacted with the surface of the substrate of plasma display panel, and then, subjected to a sintering step.

Namely, for the purpose of obtaining a desired configuration of barrier ribs, this desired configuration is formed on a film substrate at first in the step (1); and then, the configuration formed on a film substrate is transferred to a glass substrate.

The aforementioned manufacturing method is accompanied with the following problems.

(1) Since the configuration of barrier ribs is formed on a film at first, and then, the configuration of barrier ribs is transferred, it is very difficult to secure the positional precision (dimensional precision). Because the barrier ribs are required to be aligned with an electrode to interposed between these barrier ribs, and a positional precision of about ±2–10 µm/m is required.

Referring to FIG. 5, the longitudinal direction of the barrier ribs is orthogonally intersected with the longitudinal direction of the film. Accordingly, if the barrier ribs are to be formed in the direction shown in FIG. 5, the precision of the barrier ribs is directly influenced by the shrinkage and expansion of the film, so that in the case of polyester film to be employed in the example for example, the expansion of the polyester film is required to be adjusted through a precise tension control in the longitudinal direction thereof on the occasion of transferring to thereby adjust the pitch of the barrier ribs.

Further, even if the barrier ribs are to be formed in the orthogonally intersecting direction as shown in FIG. 5, i.e. in the direction where the longitudinal direction of the barrier ribs is coincide with the longitudinal direction of the film, a precise tension control in the lateral direction thereof is required. In this case, the tension control in the longitudinal direction of the film is also required for preventing the generation of defects such as a disconnection of barrier ribs, etc. It is also difficult to carry out the winding of film. As shown in FIG. 6, the film should most preferably be disposed flat after finishing the transferring of the barrier ribs on the film.

(2) Although the configuration of the barrier rib should preferably be trapezoidal as it is viewed from the back substrate side, if the configuration of the barrier rib is such as shown in FIGS. 6 and 7, the configuration of the corresponding portions of the intaglio would be such that it is tapering in the direction toward the surface thereof. As a result, it would become very difficult to release a cured barrier rib portion from the intaglio. By the way, the configuration that can be easily released from the intaglio is a reversed trapezoid.

(3) A problem which will be raised also in this method is the entrapment of air bubbles. However, the aforementioned publication is silent about this problem.

On the other hand, Jpn. Pat. Appln. KOKAI No. H10-101373 sets forth a very comprehensive and conceptual method, and the method of the present invention is included in part in the method of this Publication H10-101373. FIG. 8 shows a drawing which is also shown in this Publication H10-101373.

This patent publication mentions that it includes not only a rotary system but also a flat system, either of which however are already disclosed in the aforementioned publications.

In conclusion, this publication simply sets forth a gathering of known methods except that it discloses the employment of a thermoplastic resin. Further, nothing is insisted in this publication about any prominent effects to be obtained from a specific combination of known methods.

Almost nothing is known about a specific embodiment of apparatus which is useful for actually realizing these conventional methods. Basic reasons for this may be ascribed to the problems that some of them are excellent as an idea but are difficult to actually realize, some of them fail to disclose a specific means for securing the accuracy, and some of them are poor in durability.

For example, as for the method of scraping out a redundant portion of ink from the roll supplied with the ink, Jpn. Pat. Appln. KOKAI No. H10-101373 proposes to employ a member called doctor as shown in FIG. 8. However, when such a method is adopted for removing a redundant portion of ink, the surface of intaglio would be abraded and damaged with time unless the surface of the roll is very hard and excellent in slip properties. Therefore, it is required in a gravure printing to employ a metal roll having a chrome-plated surface. The employment of a plastic roll is also conceivable as an idea and may be advantageous in various aspects, but is too poor in hardness, thus permitting it to be easily abraded, so that a plastic roll is not actually employed.

Further, Jpn. Pat. Appln. KOKAI No. H10-101373 fails to teach anything about the surface hardness and abrasion resistance of the roll. However, according to examples thereof, a silicone rubber type roll which is made of a room temperature curing silicone (RTV141) is employed therein. However, since the rubber hardness of RTV is 100 at most, the silicone rubber type roll seems to be very questionable in terms of durability. On the other hand, if the intaglio is very hard, it would be impossible to perform a printing on a rigid substrate such as a glass substrate.

The present invention has been accomplished in view of the aforementioned circumstances, and therefore, a first object of the present invention is to provide a plasma display panel and a manufacturing method thereof, which make it possible to easily obtain a large image area of 40 inches or more, to realize an increased fineness of discharge display cell, to obtain a stable and accurate luminescence display, and to enhance the durability thereof.

A second object of the present invention is to provide a plasma display panel which is provided with barrier ribs which can be hardly collapsed even if the width thereof is minimized, and which makes it possible to minimize the leak of luminescence light toward the rear side of the back substrate, to accurately set the alignment between the electrodes and the barrier ribs, and to prevent the generation of disconnection or short circuit of electrodes.

A third object of the present invention is to provide a plasma addressed liquid crystal display panel structure and a manufacturing method thereof, which make it possible to erect transparent barrier ribs perpendicular to a glass substrate, and to produce the transparent barrier ribs having a smooth sidewalls.

A fourth object of the present invention is to provide a method and an apparatus, which is suited for mass-production, and which make it possible to form a thick projected pattern directly onto a rigid substrate with excellent reproducibility by way of intaglio-rotating system.

BRIEF SUMMARY OF THE INVENTION

According to a first embodiment of a first aspect of the present invention, there is provided a plasma display panel comprising:

a back substrate;

barrier ribs arranged on the back substrate;

electrodes each formed in a region partitioned by the barrier ribs; and a dielectric layer covering the electrodes;

wherein the barrier ribs and the dielectric layer comprise the same barrier rib-forming material containing a low melting point glass frit.

According to a second embodiment of the first aspect of the present invention, there is provided a method of manufacturing a plasma display panel, which comprises the steps of:

filling a barrier rib-forming paste containing glass frit in a barrier ribs-forming intaglio;

superimposing a substrate on the barrier ribs-forming intaglio filled with the barrier rib-forming paste containing glass frit to thereby transfer the barrier rib-forming paste onto the substrate; and heating the barrier rib-forming paste which is transferred to the substrate, thereby burning out existing organic components and concurrently sintering the glass frit to thereby form the barrier ribs and dielectric layer.

The followings are preferable embodiments of this first aspect of the present invention.

(1) The film thickness of the dielectric layer is in the range of 5 to 50 μm.

(2) The film thickness of the dielectric layer is in the range of 5 to 20 μm.

(3) The dielectric layer has a two-layer structure comprising a barrier rib material layer, and a low melting point glass paste layer which differs in material from the barrier rib material.

(4) The film thickness of the dielectric layer is in the range of 5 to 20 μm, and the dielectric layer has a two-layer structure comprising a barrier rib material layer, and a low melting point glass paste layer which differs in material from the barrier rib material.

(5) A barrier rib-forming paste containing glass frit is filled in a barrier ribs-forming intaglio, and a dielectric layer having a predetermined thickness is concurrently formed on the intaglio, the dielectric layer being subsequently transferred onto the substrate.

According to a second aspect of the present invention, there is provided a plasma display panel comprising:

a back substrate; and barrier ribs arranged on the back substrate;

electrodes each formed in a region partitioned by the barrier ribs;

wherein the barrier ribs have a recessed structure comprising a bottom structure contacting with the back substrate, and an upper structure projected from the bottom structure; and the electrodes are each disposed at the bottom of the recessed structure.

According to the second aspect of the present invention, since the dielectric layer disposed at the bottom of discharge display cell which is surrounded by the back substrate and the barrier ribs formed integral with the back substrate can be optimized in thickness thereof to thereby make it possible to obtain the dielectric layer of uniform thickness, the quantity of electric charge of the dielectric material constituting the dielectric layer can be made uniform, thereby making it possible to realize a stable and accurate luminescence display.

Further, since the dielectric material constituting the dielectric layer is the same as the material constituting the barrier ribs, and additionally, since the dielectric layer can be formed concurrent with the formation of the barrier ribs, the productivity can be enhanced and the manufacturing cost can be saved in the manufacture of the substrate for plasma display.

The followings are preferable embodiments of this second aspect of the present invention.

(1) The visible light reflectivity of the regions other than the electrodes is 50% or more, more preferably 70% or more under the condition where a phosphor is not coated.

(2) A recessed portion is formed at the bottom of the opening portion of the recessed structure, and the electrode is disposed at this recessed portion.

(3) The width of the recessed portion is the same in size as the bottom of the opening portion of the recessed structure.

(4) The electrode is formed of a metal wire or a metal plate.

(5) The thickness of the bottom of the recessed structure is larger than the width of the upper structure of the recessed portion.

(6) The thickness of the bottom of the recessed portion which is formed at the bottom of the opening of the recessed structure is larger than the width of the upper structure of the recessed portion.

(7) A dielectric layer is formed at the bottom of the recessed structure, and a total of the thickness of the bottom structure of the recessed structure and the thickness of the dielectric layer is larger than the width of the upper structure of the recessed portion.

According to a first embodiment of a third aspect of the present invention, there is provided a back plate of plasma addressed liquid crystal display panel comprising:

a back substrate;

a transparent dielectric layer formed on the back substrate;

transparent barrier ribs arranged on the transparent dielectric layer and comprising the same material as that of the transparent dielectric layer;

an anode formed on the transparent dielectric layer; and
a cathode formed on the transparent dielectric layer.

The followings are preferable examples of a first embodiment according to the third aspect of the present invention.

(1) The film thickness of the transparent dielectric layer is in the range of 3 to 15 μm.

(2) The angle between the sidewall of the transparent barrier rib and the back substrate is in the range of 85 to 95 degrees.

(3) The surface roughness of the sidewall of the transparent barrier rib is within 1 μm and is equivalent almost to an optical flat surface.

(4) The anode and the cathode comprise the same material.

(5) The anode and the cathode comprises a thick film or a plated film, each containing 80% or more of Ni.

(6) The anode and the cathode comprises a thick film or a vapor-deposited film, each containing 80% or more of Al.

(7) Among the anode and the cathode, at least cathode has a two-layer structure.

(8) A back plate of the plasma addressed liquid crystal display panel claimed in any one of claims 16 to 19.

(9) The anode and the cathode comprise the same material having a photosensitivity, and employed respectively as an underlying electrode, and at least the cathode is provided thereon with a protective plating having a sputter resistance against the cation of discharging gas and containing 80% or more of Ni.

(10) The underlying electrode is formed by using a photosensitive Ag paste.

According to a second embodiment of the third aspect of the present invention, there is provided a method of manufacturing a back plate of plasma addressed liquid crystal display panel, which comprises:

coating a barrier rib-forming paste containing glass frit on a surface of substrate;

forming a pattern of barrier ribs by pressing the barrier rib-forming paste formed on the surface of substrate by making use of a barrier rib-forming intaglio;

heating the pattern of barrier ribs, thereby burning out existing organic components and concurrently sintering the glass frit to thereby form transparent barrier ribs and a transparent dielectric layer; and forming a cathode and an anode on the transparent dielectric layer.

According to a third embodiment of the third aspect of the present invention, there is provided a method of manufacturing a back plate of plasma addressed liquid crystal display panel, which comprises:

filling a barrier rib-forming paste containing glass frit in a barrier ribs-forming intaglio, while concurrently enabling a dielectric layer having a predetermined thickness to be formed on the intaglio;

superimposing a substrate on the barrier ribs-forming intaglio filled with the barrier rib-forming paste to thereby transfer the barrier rib-forming paste onto the substrate to form a pattern of barrier ribs;

heating the pattern of barrier ribs, thereby burning out existing organic components and concurrently sintering the glass frit to thereby form transparent barrier ribs and a transparent dielectric layer; and forming a cathode and an anode on the transparent dielectric layer.

The followings are preferable examples of the second and third embodiments according to the third aspect of the present invention.

(1) The anode and the cathode are formed by means of an electroless plating method.

(2) The anode and the cathode are formed by a procedure comprising: coating a thick film paste; coating a liquid photoresist; patterning the photoresist; forming an electrode pattern by means of sand blast; and sintering the electrode pattern.

(3) The anode and the cathode are formed by means of a photosensitive paste method.

(4) The anode and the cathode are formed by means of a vapor deposition method.

(5) Among the anode and the cathode, at least the cathode has a two-layer structure, and an underlying electrode of the two-layer structure is formed through an electrolytic plating using a material having a sputter resistance against plasma cation.

According to a first embodiment of the fourth aspect of the present invention, there is provided a recessed and projected pattern-forming apparatus of rotary type for forming a cured recessed and projected pattern of an ionizing radiation-curable resin composition on a rigid plate, the apparatus comprising:

an intaglio-rotating roll provided on the surface thereof with a predetermined recessed and projected pattern constituted by a releasable surface;

a pinching mechanism for enabling the ionizing radiation-curable resin composition to be continuously pinched between the intaglio-rotating roll and an ionizing radiation-permeable releasable film while keeping a predetermined thickness of the ionizing radiation-curable resin composition;

an radiation irradiating mechanism for irradiating an ionizing radiation to the resin composition under the aforementioned pinched condition;

a releasing mechanism for releasing the ionizing radiation-permeable releasable film from the surface of the intaglio-rotating roll after finishing the curing of the ionizing radiation-curable resin composition;

a press mechanism which is designed such that the rigid plate is fed over the intaglio-rotating roll for enabling the rigid plate to be superimposed and aligned, at a predetermined precision, with the ionizing radiation-curable resin composition which is cured by the ionizing radiation, and that the resultant composition thus aligned is placed into a compressed state; and a releasing mechanism for enabling the rigid plate to be released from the surface of the intaglio-rotating roll after a termination of the compressed state.

According to a second embodiment of the fourth aspect of the present invention, there is provided a rotary type recessed and projected pattern-forming method for forming a cured recessed and projected pattern of an ionizing radiation-curable resin composition on a rigid plate, the method comprising:

continuously permitting the ionizing radiation-curable resin composition to be pinched between an intaglio-rotating roll and an ionizing radiation-permeable releasable film while keeping a predetermined thickness of the ionizing radiation-curable resin composition, the intaglio-rotating roll being provided on the surface thereof with a predetermined recessed and projected pattern constituted by a releasable surface;

irradiating an ionizing radiation onto the resin composition under the aforementioned pinched condition;

releasing the ionizing radiation-permeable releasable film from the surface of the intaglio-rotating roll after finishing the curing of the ionizing radiation-curable resin composition;

feeding the rigid plate over the intaglio-rotating roll for enabling the rigid plate to be superimposed and aligned, at a predetermined precision, with the ionizing radiation-curable resin composition which is cured by the ionizing radiation, and placing the resultant composition thus aligned into a compressed state; and releasing the rigid plate from the surface of the intaglio-rotating roll after a termination of the compressed state.

The followings are preferable examples of the first and second embodiments according to the fourth aspect of the present invention.

(1) The surface of the intaglio-rotating roll comprises silicone resin.

(2) These embodiments further comprises a mechanism or step of preliminarily coating a self-adhesive or an adhesive onto the rigid plate to be fed over the intaglio-rotating roll.

(3) These embodiments further comprises a mechanism or step of coating a transferring resin onto the surface of the cured ionizing radiation-curable resin composition.

(4) The width of the ionizing radiation-permeable releasable film having a releasability is larger than the width of the intaglio-rotating roll.

(5) The mechanism or step of continuously permitting the ionizing radiation-curable resin composition to be pinched between an intaglio-rotating roll and an ionizing radiation-permeable releasable film while keeping a predetermined thickness of the ionizing radiation-curable resin composition is constituted by a mechanism or step wherein the ionizing radiation-curable resin composition is coated in advance on the surface of the ionizing radiation-permeable releasable film, and then, the film is superimposed with the intaglio-rotating roll.

(6) These embodiments further comprises a mechanism or step of preliminarily coating a self-adhesive or an adhesive onto the surface of the ionizing radiation-permeable releasable film.

(7) These embodiments further comprises a mechanism or step of feeding a liquid to a region where the intaglio-rotating roll begins to be in contact with the ionizing radiation-curable resin composition.

(8) These embodiments further comprises a mechanism or step of feeding a liquid to a region where the intaglio-rotating roll begins to be in contact with the rigid plate.

(9) The mechanism of transferring the rigid plate is constituted by an X-Y-θ table having a mechanism of securing the rigid plate and designed to be moved following a guide rail.

(10) An alignment mark is attached to both of the intaglio-rotating roll and the rigid plate at their corresponding positions, thereby making it possible to transfer the alignment mark of the intaglio to the rigid plate, and to measure any misregistration between the alignment mark of the intaglio which is transferred to the rigid plate and the alignment mark of the rigid plate, thereby enabling the position of the X-Y-θ table holding the rigid plate to be adjusted correspondingly so as to perform the alignment between the intaglio and the rigid plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Various embodiments of the present invention will be explained in details with reference to the drawings as follows.

First of all, the dielectric layer of plasma display panel substrate and the manufacturing method thereof according to a first aspect of the present invention will be explained.

Figure 9:
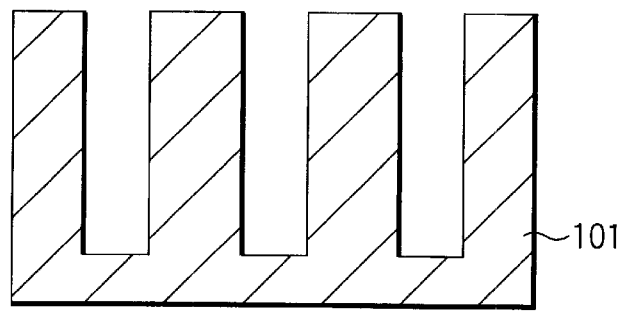
FIG. 9 is a drawing illustrating one example of the barrier rib-forming intaglio which is adapted to be employed in a first aspect of the present invention.

As shown in FIG. 9, barrier rib-forming intaglio 101 corresponds to a reversed configuration of barrier ribs. As for the barrier rib-forming intaglio 101, a metal intaglio or a resin intaglio can be employed, and the configuration thereof may be of a cylindrical plate or a flattened plate.

As a typical example of the metal intaglio, a copper plate engraved or etched, i.e. such as those employed in the intaglio printing can be employed. As for the resin intaglio, it can be manufactured by a method where a resin is filled in a metallic letterpress constituting a matrix of intaglio, and then, the copy thereof is taken up as an intaglio, or by a method where a photosensitive resin is cured through a photomask, and the resultant cured resin is subjected to a development process to thereby form an intaglio.

Figure 10:
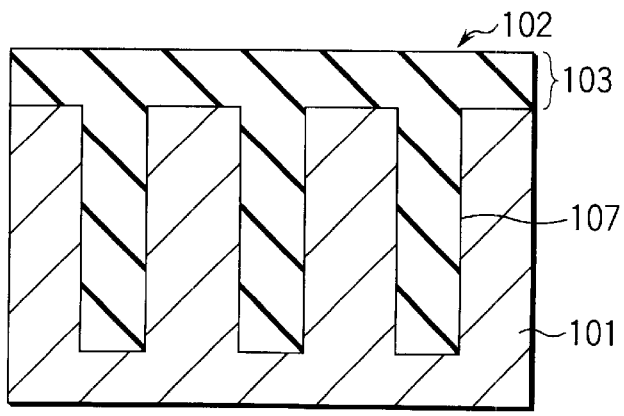
FIG. 10 is a drawing illustrating a state wherein a barrier rib-forming material is filled in the barrier rib-forming intaglio which is adapted to be employed in a first aspect of the present invention.

As shown in FIG. 10, barrier rib-forming material 102 is filled in the barrier rib-forming intaglio 101 to thereby allowing dielectric layer 103 to be produced concurrently. More specifically, barrier rib-forming material 102 is filled in the groove of barrier rib-forming intaglio 101, and at the same time, a layer having an uniform thickness is allowed to be formed on the intaglio. As a result, the dielectric layer 103 can be formed on the top of the barrier rib-forming intaglio 101.

By making use of the aforementioned method, it becomes possible to overcome various problems which may be raised on the occasion of filling the paste in the intaglio, i.e. to prevent the paste filled in the intaglio from being taken out by a doctor blade, to prevent the entrapment of air bubble in the paste, or to prevent the paste from being left in the intaglio.

Further, if the thickness of the dielectric layer 103 is too thin, the electrodes may be exposed, thereby making the dielectric layer 103 ineffective. On the other hand, if the thickness of the dielectric layer 103 is too thick, it will invite the generation of splits or cracks on the occasion of sintering the substrate.

The barrier ribs 107 and dielectric layer 103 should preferably be white in color and excellent in reflectance so as to enable the luminescence of phosphor to be reflected to thereby improve the brightness. Therefore, a white pigment such as $TiO_2$, $ZrO_2$, $Al_2O_3$, etc. can be added to the barrier rib-forming material 102. In this case, the ratio of a white pigment to a low melting point glass is generally in the range of 3 to 30% in view of maintaining the configuration of the barrier ribs 107 in the sintering step as well as in view of density of the barrier ribs 107.

If it is desired to employ the barrier rib-forming material 102 as a protective layer 103 of electrode, the thickness of the dielectric layer 103 is required to be 5 μm or more in order to obtain a sufficient reflectance. On the other hand, if the thickness of the dielectric layer 103 is 50 μm or more, it will invite an increase of address voltage or it may become difficult to perform accurate address, and hence it is undesirable.

Due to these reasons, the thickness of the dielectric layer 103 should preferably be in the range of 5 to 50 μm. However, particularly in view of lowering the address voltage so as to decrease the driving voltage of driving circuit as low as possible and to reduce the cost of dielectric material, the thickness of the dielectric layer 103 should preferably be 20 μm or less.

As for the barrier rib-forming material 102 to be charged into the barrier rib-forming intaglio 101, the employment of a paste having an excellent fluidity is preferable for the purpose of filling the intaglio. As for the type of curing, it may be selected from an evaporation curing type, a heat curing type, a two-part curing type, and an ionizing radiation curing type such as ultraviolet rays, electron beam, X-rays, etc. Therefore, the barrier rib-forming material comprises an inorganic powder which is capable of sintering through sintering, and an organic component for giving a fluidity to the paste and for retaining the configuration of barrier rib after the curing thereof.

As for the inorganic component, it is possible to employ the powder of a low melting point glass represented by $PbO$—$B_2O_3$—$SiO_2$, to which a white pigment such as $Al_2O_3$, $TiO_2$, $ZrO_2$, etc. may be added. However, for the purpose of adjusting the color tone of the barrier ribs, any desired pigments may be added to the glass powder.

As for the organic component, though it may differ depending on the cured state, a material which is capable of removing a binder therefrom at a temperature of not higher than the glass softening temperature thereof is preferable. In the case of the evaporation curing type for example, a solution of resin wherein a general-purpose natural resin, a semi-synthetic resin or a synthetic resin is dissolved in a solvent can be employed. In the cases of the heat curable type, the two-part curing type and the ionizing radiation curing type, a cured state of paste can be achieved by combining a reactive resin or a reactive monomer with a polymerization initiator. Two of more kinds of these cured types can be combined together.

Figure 11:
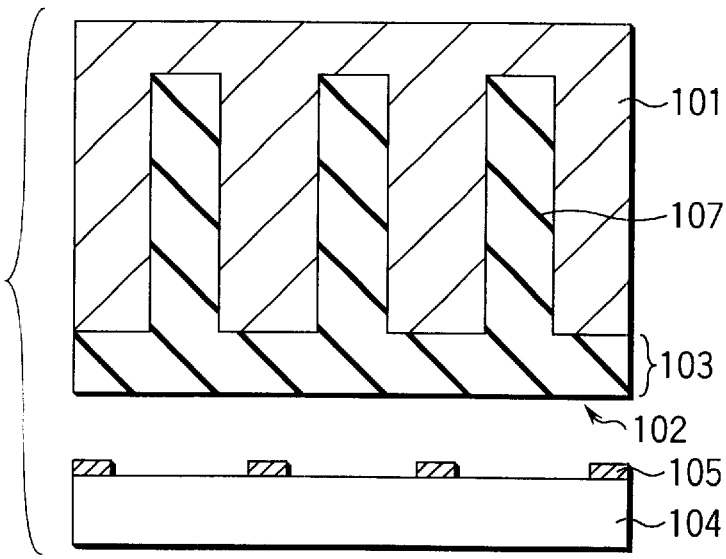
FIG. 11 is a drawing illustrating a state of alignment between a glass substrate bearing thereon an electrode pattern and the barrier rib-forming intaglio filled with a barrier rib-forming material in a first aspect of the present invention.

After the barrier rib-forming material 102 is filled in the barrier rib-forming intaglio 101, the positioning of the glass substrate 104 having an electrode pattern 105 deposited thereon in advance is performed as shown in FIG. 11, and then, the barrier rib-forming material 102 is transferred to the surface of the glass substrate 104. In this case, any of the following methods can be selected, i.e. a method wherein the barrier rib-forming material 102 is allowed to cure before the barrier rib-forming material 102 is transferred onto the glass substrate 104; and a method wherein the barrier rib-forming material 102 is allowed to contact with the glass substrate 104 before the barrier rib-forming material 102 is still in an uncured state, and under this condition, the barrier rib-forming material 102 is allowed to cure. Although any of these methods can be selected, it is more preferable to cure the barrier rib material before it is transferred to the glass substrate in order to prevent the generation of transfer residue of the barrier rib material in the intaglio.

Figure 12:
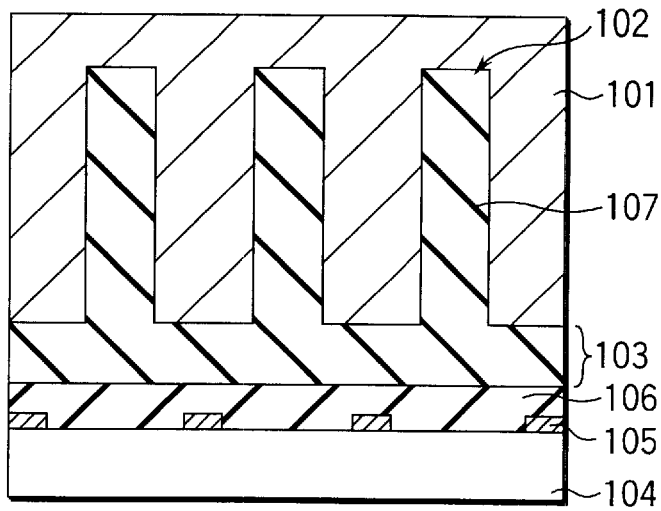
FIG. 12 is a drawing illustrating a transferring step where an adhesive or a self-adhesive is employed in a first aspect of the present invention.

In the case of the former transfer method, an adhesive or a self-adhesive 106 is required to be interposed between the barrier rib-forming material 102 and the glass substrate 104 as shown in FIG. 12. In the case of the latter transfer method however, since the barrier rib-forming material 102 is allowed to cure on the glass substrate 104, the adhesive or the self-adhesive 106 is no longer required to be employed. However, the adhesive or the self-adhesive 106 may be employed for the purpose of enhancing the mechanical strength of the barrier ribs.

Figure 13:
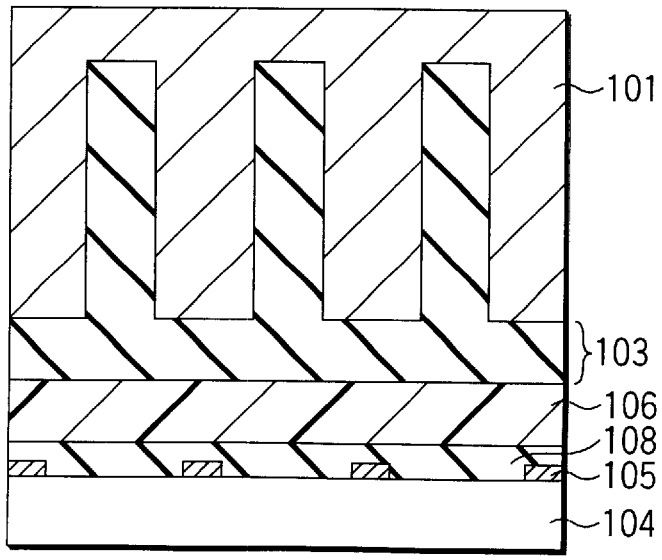
FIG. 13 is a drawing illustrating a state where a dielectric layer of two-layer structure is formed on the surface of substrate in a first aspect of the present invention.
Figure 14:
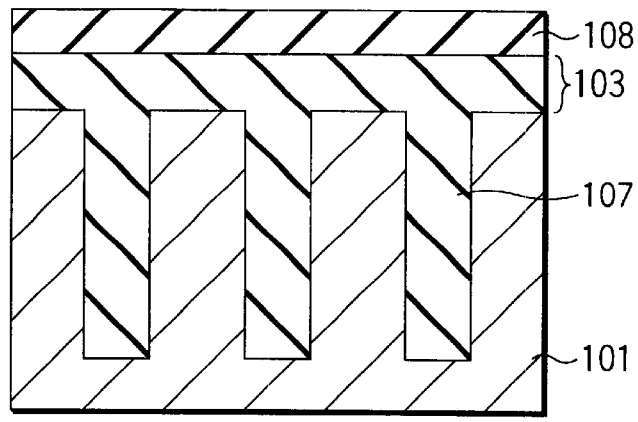
FIG. 14 is a drawing illustrating a state where a dielectric layer of two-layer structure is formed on the surface of intaglio in a first aspect of the present invention.

By the way, as shown in FIG. 13, a dielectric layer comprising a low melting point glass paste which differs from the barrier rib-forming material may be formed over the electrode pattern formed in advance on the back plate. Further, as shown in FIG. 14, the barrier rib-forming material is filled in the recessed portions of the barrier rib-forming intaglio 101 so as to enable the dielectric layer to be formed concurrently, and then, a dielectric layer 108 comprising a low melting point glass paste which differs from the barrier rib-forming material may be formed over the barrier rib-forming material filled in the recessed portions. In this case however, the dielectric layer becomes a two-layer structure consisting of the dielectric layer 103 that has been formed concurrent with the barrier ribs using a barrier rib-forming material, and the dielectric layer 108 comprising a low melting point glass paste which differs from the barrier rib-forming material.

Depending on the thickness of the dielectric layer and also on the barrier rib-forming material, splitting or cracks may be generated on the occasion of sintering the dielectric layer and the barrier ribs due to the recess and projection of the electrode pattern formed on the glass substrate. If the generation of these splitting or cracks is to be prevented, it would be effective to form a dielectric layer comprising a low melting point glass paste which differs from the barrier rib-forming material on the electrode pattern that has been formed on a glass substrate. It is possible, with the provision of this dielectric layer, to absorb the recess and projection of the electrode pattern and hence to flatten the surface, thereby making it possible to prevent the generation of these splitting or cracks.

As for the low melting point glass paste, it is preferable to employ those which are consisting only of low melting point glass frit comprising no inorganic aggregate. However, a dielectric paste available in the market can be also employed as long as the softening point thereof is lower than that of the barrier rib-forming material.

Figure 15:
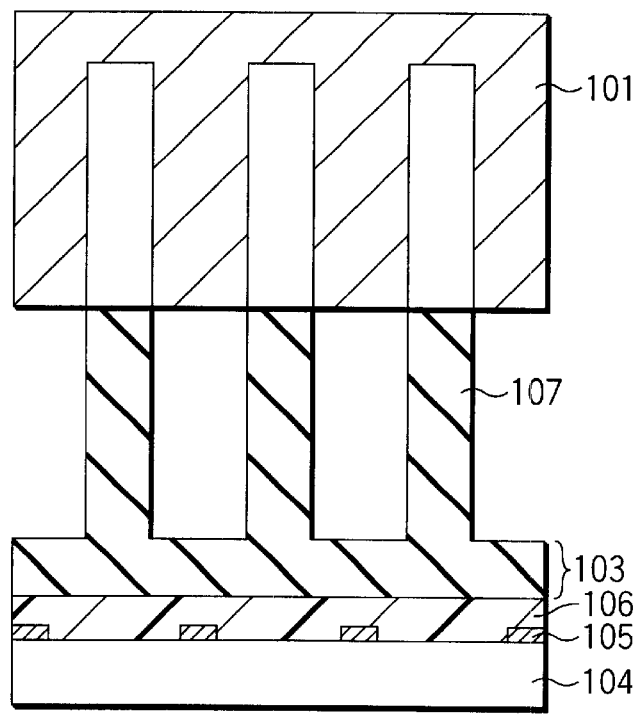
FIG. 15 is a drawing illustrating a state wherein the barrier rib-forming intaglio to be employed in a first aspect of the present invention is peeled away.
Figure 16:
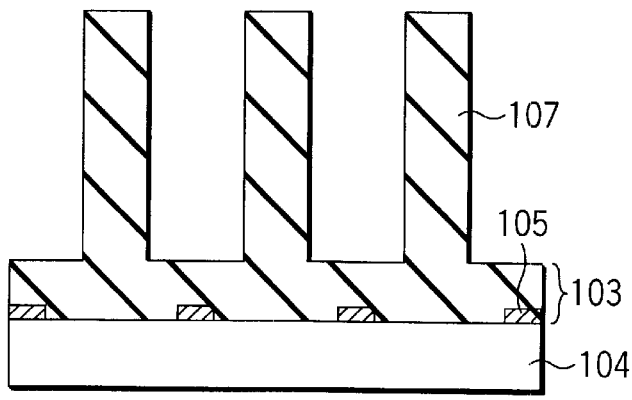
FIG. 16 is a drawing showing a back plate after the sintering thereof according to a first aspect of the present invention.

Thereafter, as shown in FIG. 15, the glass substrate 104 transferred to the barrier ribs 107 is baked to vanish organic components and to sinter the glass components. As a result, the back plate of plasma display panel, which is provided with inorganic barrier ribs 107 and the dielectric layer 103 can be obtained as shown in FIG. 16.

As explained above, according to the first aspect of the present invention, the back plate of plasma display panel can be manufactured by making use of a method wherein the dielectric layer 103 and the barrier ribs 107 are both formed of the same material.

Next, specific examples of the first aspect of the present invention will be explained. By the way, it should be noted that the following examples are not intended to limit the scope of the present invention.

EXAMPLE 1

The barrier rib-forming intaglio employed herein has the following features.

The type of intaglio: Flat type resin intaglio made of polyethylene;

The configuration of grooves: Stripe-shaped, 30 $\mu$m in width, 200 $\mu$m in depth and 140 $\mu$m in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate | 10 parts by weight |
| 2-hydroxyproply acrylate | 7 parts by weight |
| Benzophenone | 1 part by weight |

The barrier rib-forming material thus obtained was filled, by means of roll press, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 $\mu$m in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 10 $\mu$m.

EXAMPLE 2

The barrier rib-forming intaglio employed herein has the following features.

The type of intaglio: Flat type resin intaglio made of silicone rubber;

The configuration of grooves: Stripe-shaped, 30 $\mu$m in width, 200 $\mu$m in depth and 140 $\mu$m in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate | 10 parts by weight |
| 2-hydroxyproply acrylate | 7 parts by weight |
| Benzophenone | 1 part by weight |

The barrier rib-forming material thus obtained was filled, by means of doctor blade, in a silicone rubber flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 10 μm.

EXAMPLE 3

The barrier rib-forming intaglio employed herein has the following features.

The type of intaglio: Flat type resin intaglio made of silicone rubber;

The configuration of grooves: Stripe-shaped, 50 μm in width, 150 μm in depth and 150 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate: | 7 parts by weight |
| Benzophenone: | 1 part by weight |

The barrier rib-forming material thus obtained was filled, by means of doctor blade, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 5 μm.

EXAMPLE 4

The barrier rib-forming intaglio employed herein has the following features.

The type of intaglio: Flat type resin intaglio made of polystyrene;

The configuration of grooves: Stripe-shaped, 50 μm in width, 150 μm in depth and 150 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate: | 7 parts by weight |
| Benzophenone: | 1 part by weight |

The barrier rib-forming material thus obtained was filled, by means of screen printing, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 20 μm. By the way, when a panel manufactured using this back plate was driven, the address voltage was 50V and the address discharge-initiating voltage was 230V.

EXAMPLE 5

The barrier rib-forming intaglio employed herein has the following features.

The type of intaglio: Flat type resin intaglio made of polystyrene;

The configuration of grooves: Stripe-shaped, 50 μm in width, 150 μm in depth and 150 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate: | 7 parts by weight |
| Benzophenone: | 1 part by weight |

The barrier rib-forming material thus obtained was filled, by means of screen printing, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 40 μm. By the way, when a panel manufactured using this back plate was driven, the address voltage was 60V and the address discharge-initiating voltage was 250V.

EXAMPLE 6

The barrier rib-forming intaglio employed herein has the following features.

The type of intaglio: Flat type resin intaglio made of silicone rubber;

The configuration of grooves: Stripe-shaped, 70 μm in width, 175 μm in depth and 360 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate | 7 parts by weight |
| Benzophenone | 1 part by weight |

A mixture consisting of the following composition was fully kneaded by making use of a roll mill to obtain a dielectric layer-forming material differing in composition from that of the barrier rib-forming material.

| | |
|---|---|
| PbO—B$_2$O$_3$—SiO$_2$ type low melting point glass powder: | 60 parts by weight |
| Ethyl cellulose: | 15 parts by weight |
| Butylcarbitol acetate: | 25 parts by weight |

The barrier rib-forming material thus obtained was filled, by means of screen printing, in a silicone rubber flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

An electrode pattern was formed at first on the surface of glass substrate, and then, a dielectric layer consisting of a low melting point glass paste differing in composition from that of the barrier rib-forming material was deposited to a thickness of 5 μm by means of screen printing. Thereafter, an acrylic self-adhesive was coated all over the glass substrate to a thickness of 5 μm. Then, the intaglio filled with the barrier rib-forming material was placed on and aligned with the glass substrate, and a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 10 μm.

EXAMPLE 7

The barrier rib-forming intaglio employed herein has the following features.

The type of intaglio: Flat type resin intaglio made of silicone rubber;

The configuration of grooves: Stripe-shaped, 70 μm in width, 175 μm in depth and 360 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate | 7 parts by weight |
| Benzophenone | 1 part by weight |

A mixture consisting of the following composition was fully kneaded by making use of a roll mill to obtain a dielectric layer-forming material differing in composition from that of the barrier rib-forming material.

| | |
|---|---|
| PbO—B$_2$O$_3$—SiO$_2$ type low melting point glass powder: | 60 parts by weight |
| Ethyl cellulose: | 15 parts by weight |
| Butylcarbitol acetate: | 25 parts by weight |

The barrier rib-forming material thus obtained was filled, by means of screen printing, in a silicone rubber flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, a dielectric layer-forming material having a different composition from that of the barrier rib-forming material was deposited to a thickness of 5 μm by means of screen printing on the surface of intaglio having barrier ribs and dielectric layer formed thereon. Thereafter, an acrylic self-adhesive was coated all over the glass substrate provided in advance with an electrode pattern to thereby form an acrylic self-adhesive layer having a thickness of 5 μm. Then, the intaglio filled with the barrier rib-forming material was placed on and aligned with the glass substrate, and a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 10 μm.

COMPARATIVE EXAMPLE 1

The barrier rib-forming intaglio employed herein has the following features.

The type of intaglio: Flat type resin intaglio made of polystyrene;

The configuration of grooves: Stripe-shaped, 50 μm in width, 150 μm in depth and 150 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate: | 7 parts by weight |
| Benzophenone: | 1 part by weight |

The barrier rib-forming material thus obtained was filled, by means of screen printing, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 60 μm. However, a large number of splits or cracks were recognized at the barrier ribs and the dielectric layer on the occasion of sintering, thus failing to obtain a non-defective back plate.

COMPARATIVE EXAMPLE 2

The barrier rib-forming intaglio employed herein has the following features.

The type of intaglio: Flat type resin intaglio made of polystyrene;

The configuration of grooves: Stripe-shaped, 50 μm in width, 150 μm in depth and 150 μm in pitch.

The barrier rib-forming material was obtained by fully kneading the following composition by making use of a roll mill.

| | |
|---|---|
| PbO—B$_2$O$_3$—SiO$_2$ type low melting point glass powder: | 62 parts by weight |
| Al$_2$O$_3$: | 12 parts by weight |
| TiO$_2$: | 8 parts by weight |
| Diethylene glycol dimethacrylate: | 10 parts by weight |
| 2-hydroxyproply acrylate: | 7 parts by weight |
| Benzophenone: | 1 part by weight |

The barrier rib-forming material thus obtained was filled, by means of screen printing, in a polystyrene flat intaglio having recessed portions, i.e. reversed in configuration of the barrier ribs, thereby simultaneously forming the portion of barrier ribs and the portion of dielectric layer. Then, ultra-violet rays were irradiated onto this barrier rib-forming material under the condition of 2000 mJ/cm$^2$.

Then, the intaglio filled with the barrier rib-forming material was placed on and aligned with a glass substrate coated, all over the surface thereof, with acrylic self-adhesive 5 μm in thickness, and then, a flat press was performed onto the resultant composite body with a pressure of 5 Kgf/cm$^2$.

Thereafter, the intaglio was released from the substrate and baked for 30 minutes at a temperature of 580° C. to thereby obtain a back plate provided with a dielectric layer having a uniform thickness of 2 μm. However, part of the dielectric layer was left unfilled with the barrier rib-forming material on the occasion of filling the barrier rib-forming material in the intaglio by making use of a doctor blade, thus allowing part of electrodes to expose.

As explained above, according to the method of forming the barrier ribs and dielectric layer of the plasma display panel in the first aspect of the present invention, since the dielectric layer can be formed concurrent with the formation of the barrier ribs by making use of the same material, it becomes possible to provide the back plate of plasma display panel using a simple manufacturing process, and at the same time, the raw material cost thereof can be reduced.

Next, a second aspect of the present invention will be explained with reference to drawings. By the way, although only three rows of barrier ribs are shown in the drawings, the substrate will be actually constituted by a predetermined number of rows of barrier rib as required by the specification of the plasma display panel.

In this second aspect of the present invention, the barrier ribs are formed not individually in a form of column, but are formed integrally with their bottom portions being made common to each other, i.e. the barrier ribs are constituted by an assembly of U-shaped structures.

Specifically, many a number of barrier ribs 202 each having a U-shaped configuration are formed on a glass substrate 201, and an electrode 203 is disposed inside this recessed portion of the barrier rib 202. Further, this electrode 203 in the recessed portion is covered with a dielectric layer 204.

According to this structure of barrier ribs 202, since the bottoms thereof are made common to each other, the barrier ribs 202 can be hardly collapsed even if the width of barrier rib is minimized. Further, since the electrode is disposed inside this recessed portion of the barrier rib 202, the electrode 203 can be formed after the fabrication of the barrier ribs. As a result, the electrode 203 is enabled to be formed at a portion which is partitioned in advance by the barrier ribs, thereby making it possible to inhibit the generation of short circuit between electrodes 203.

Further, if the barrier ribs are constituted by a material exhibiting a visible light reflectance of 50% or more, the quantity of light to be taken up from each discharge cell can be increased. Because, if a portion of luminescence of phosphor that might have been leaked toward the back side of back plate can be reflected by the barrier ribs, the light component which is available for the display can be increased.

Figure 18:
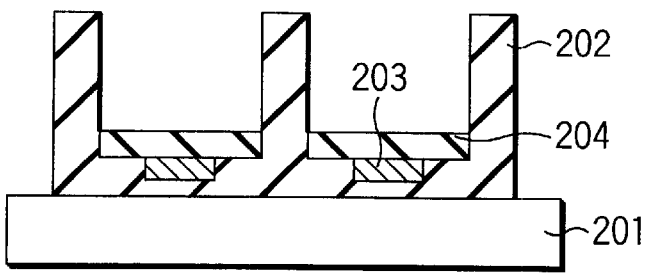
FIG. 18 is a cross-sectional view illustrating another example of the back plate of plasma display substrate according to a second aspect of the present invention.

In the case of structure shown in FIG. 18, an additional recessed portion is further formed at the bottom within the U-shaped structure constituting the barrier ribs 202, and the electrode 203 is disposed in this additional recessed portion. According to this structure, the relative positional relationship between the electrode 203 and the barrier ribs 202 can be defined on the occasion of forming the barrier ribs 202. Therefore, it is possible to obtain a plasma display panel which is accurate in relative positional relationship between the electrode 203 and the barrier ribs 202.

Figure 19:
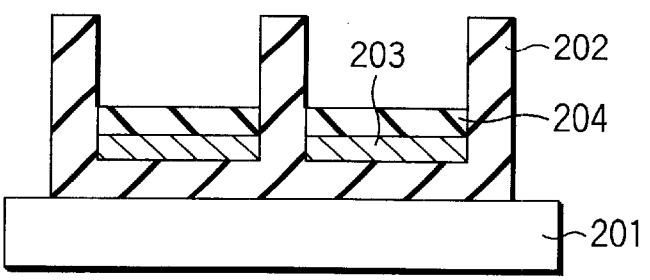
FIG. 19 is a cross-sectional view illustrating another example of the back plate of plasma display substrate according to a second aspect of the present invention.

In the case of structure shown in FIG. 19, the width of the electrode 203 is made identical with the distance (dimension of U-shaped portion) between opposed barrier ribs 202. According to this structure, it becomes possible to obtain a plasma display panel where the relative positional relationship between the electrode 203 and the barrier ribs 202 is no longer required to be taken into account.

Figure 20:
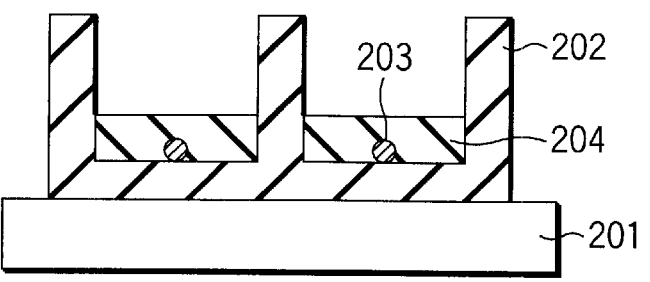
FIG. 20 is a cross-sectional view illustrating another example of the back plate of plasma display substrate according to a second aspect of the present invention.

In the case of structure shown in FIG. 20, a metal wire or a metal plate is employed for constituting the electrode 203. Namely, since a metal wire, etc. which is molded in advance is employed as the electrode, it becomes possible to obtain a plasma display panel where the disconnection of the electrode 203 can be hardly occurred, and even if the disconnection of the electrode 203 happens to be generated, it can be easily discovered. Further, since a step of sintering the electrode is no longer required, the number of steps can be reduced.

Figure 21:
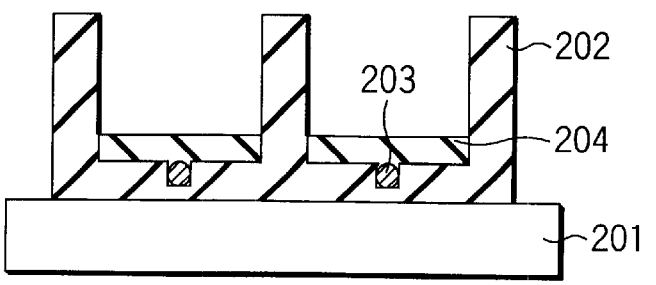
FIG. 21 is a cross-sectional view illustrating another example of the back plate of plasma display substrate according to a second aspect of the present invention.

In the case of structure shown in FIG. 21, a metal wire or a metal plate is employed for constituting the electrode 203. Namely, since a metal wire, etc. which is molded in advance is employed as the electrode, it becomes possible to obtain a plasma display panel where the disconnection of the electrode 203 can be hardly occurred, and even if the disconnection of the electrode 203 happens to be generated, it can be easily discovered. Further, since a step of sintering the electrode is no longer required, the number of steps can be reduced.

Additionally, since the relative positional relationship between the electrode and the barrier ribs can be defined depending on the configuration of the barrier ribs, it is advantageous in that the step of positioning the electrode on the occasion of forming it would be simplified.

Figure 22:
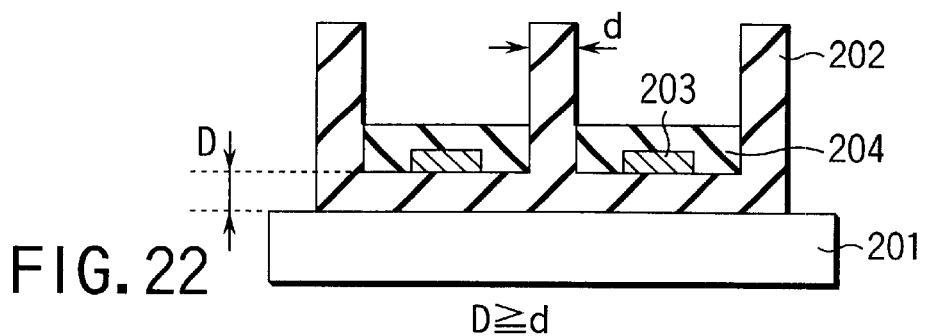
FIG. 22 is a cross-sectional view illustrating another example of the back plate of plasma display substrate according to a second aspect of the present invention.

In the case of structure shown in FIG. 22, the thickness D of the bottom of the U-shaped structure constituting the barrier ribs 202 is the same with or larger than the width d of upper portion of the structure. Namely, according to this structure, the bottom of the U-shaped structure of this embodiment is constituted by a layer having a thickness which is the same with or larger than the width of so-called barrier wall or barrier rib of plasma display.

Therefore, the permeation of light to the rear side of substrate is the same with or less than the permeation of light through the barrier rib 202, i.e. which can be disregarded as a matter of fact.

Figure 23:
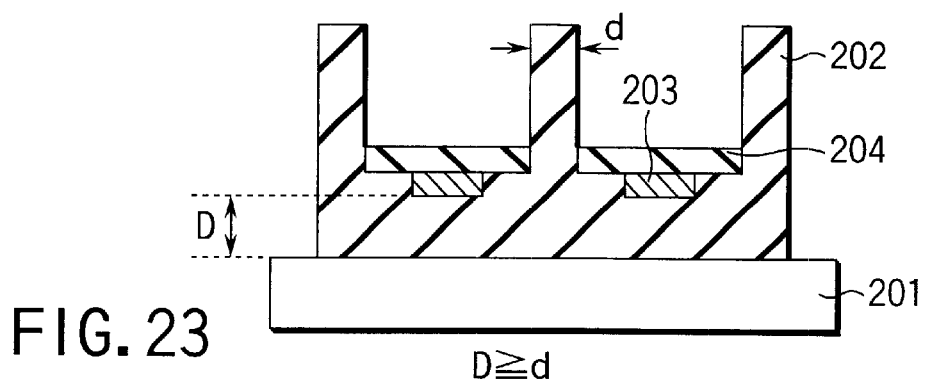
FIG. 23 is a cross-sectional view illustrating another example of the back plate of plasma display substrate according to a second aspect of the present invention.

In the case of structure shown in FIG. 23, the thickness D of a recessed portion formed in the bottom of the U-shaped structure constituting the barrier ribs 202 is the same with or larger than the width d of upper portion of the structure. Namely, according to this structure, the permeation of light to the rear side of substrate is the same with or less than the permeation of light through the barrier rib 202, i.e. which can be disregarded as a matter of fact.

Figure 24:
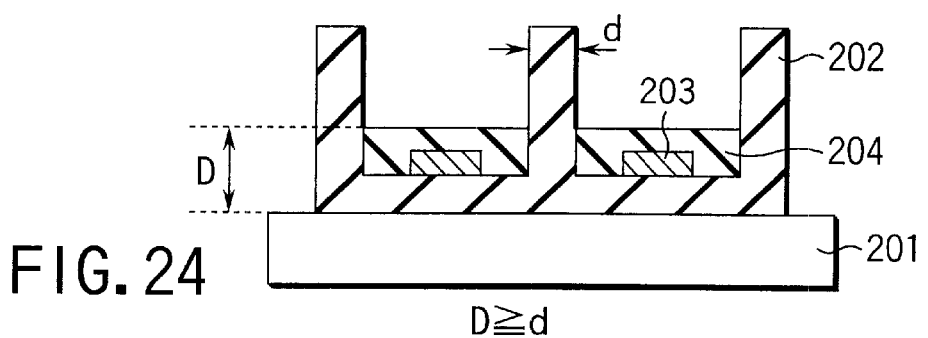
FIG. 24 is a cross-sectional view illustrating another example of the back plate of plasma display substrate according to a second aspect of the present invention.
Figure 25:
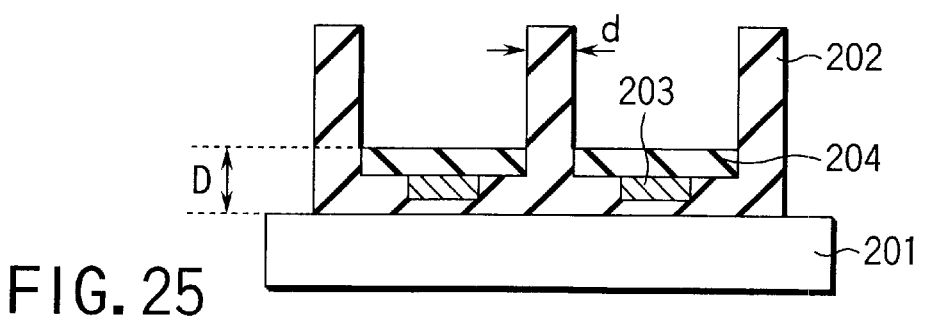
FIG. 25 is a cross-sectional view illustrating another example of the back plate of plasma display substrate according to a second aspect of the present invention.

In the cases of structure shown in FIGS. 24 and 25, the thickness D in total of thickness of the bottom of the U-shaped structure constituting the barrier ribs 202 and the thickness of the dielectric layer 204 is the same with or larger than the width d of upper portion of the structure. Namely, according to this structure, the permeation of light to the rear side of substrate is the same with or less than the permeation of light through the barrier rib 202, i.e. which can be disregarded as a matter of fact.

Next, examples of the second aspect of the present invention will be explained.

EXAMPLE 8

A barrier rib paste for sand blast (PLS-3550; Nippon Denki Gaishi Co., Ltd.) was coated on the surface of glass substrate to a thickness of 200 $\mu$m by means of screen printing method.

Then, a sand blast-resisting dry film resist (BF-703; Tokyo Ohka Kogyo, Co., Ltd.) having a thickness of 25 $\mu$m was laminated thereon.

Then, the dry film resist was subjected to an exposure at 200 mJ/cm$^2$ by making use of a high-pressure mercury lamp and through a photomask having a stripe pattern of opening 150 $\mu$m in pitch and 50 $\mu$m in width.

After the exposure, the development thereof was performed using an aqueous solution of 0.2% sodium carbonate to thereby obtain a resist pattern 150 $\mu$m in pitch and 50 $\mu$m in width.

By making use of the substrate bearing this resist pattern and a sand blast, a barrier rib paste was molded into a U-shaped configuration.

Thereafter, by making use of a BF releasing solution (Tokyo Ohka Kogyo, Co., Ltd.), the resist was removed, and then, the resultant substrate was washed with water and dried.

Figure 17:
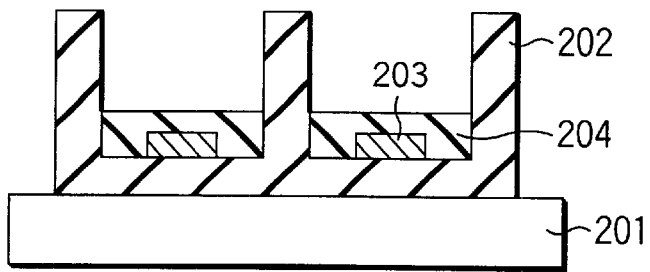
FIG. 17 is a cross-sectional view of the back plate of plasma display substrate according to a second aspect of the present invention.

The substrate from which the resist had been removed was sintered in a hot-air sintering furnace at a temperature of 580° C. for 20 minutes to obtain U-shaped barrier ribs as shown in FIG. 17.

Then, a photosensitive silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

In order to form an electrode pattern, upon finishing the drying of the silver paste, the dry film resist was subjected to an exposure at 200 mJ/cm$^2$ by making use of a high-pressure mercury lamp and through a photomask having a pattern of electrode-lead-out terminals and a stripe pattern of opening 150 $\mu$m in pitch and 30 $\mu$m in width.

After the exposure, the development thereof was performed using an aqueous solution of 0.2% sodium carbonate to thereby obtain a stripe pattern 150 $\mu$m in pitch and 30 $\mu$m in width, and a pattern of terminals to be led out from the stripe pattern.

The substrate bearing the electrode pattern was sintered in a hot-air sintering furnace at a temperature of 550° C. for 20 minutes to obtain electrodes.

Then, a dielectric paste (NP-7972J; Noritake Co., Ltd.) was coated all over the substrate bearing the electrodes by means of screen printing. In this coating step, the attack angle of squeegee was set to 20 degrees.

The substrate coated with the dielectric material was sintered in a hot-air sintering furnace at a temperature of 530° C. for 20 minutes to obtain a substrate having barrier ribs, electrodes and a dielectric layer as shown in FIG. 17.

When the substrate thus obtained was evaluated, the generation of short circuit between electrodes was not recognized.

Neither the twisting nor collapsing of barrier ribs could not be recognized.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

EXAMPLE 9

90 parts by weight of titanium oxide, 10 parts by weight of glass frit, and 10 parts by weight of ethyl cellulose solution were kneaded by means of roll mill to prepare a barrier rib paste for sand blast, which was then coated on the surface of glass substrate to a thickness of 200 μm by means of screen printing method.

By way of the same processes as in Example 1, barrier ribs, electrodes and a dielectric layer were fabricated. The thickness of the bottom portion of the U-shaped barrier rib was 20 μm, and the visible light reflectance of the regions other than the regions of electrodes was 50%.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected, according to the conventional methods, to evacuation and gas charging, thereby manufacturing a plasma display panel.

EXAMPLE 10

A barrier rib paste for sand blast (PLS-3550; Nippon Denki Gaishi Co., Ltd.) was coated on the surface of glass substrate to a thickness of 200 μm by means of screen printing method.

Then, a sand blast-resisting dry film resist (BF-703; Tokyo Ohka Kogyo, Co., Ltd.) having a thickness of 25 μm was laminated thereon.

Then, for the purpose of forming an electrode arrangement portion, the dry film resist was subjected to an exposure at 200 mJ/cm$^2$ by making use of a high-pressure mercury lamp and through a photomask having a pattern of electrode-lead-out terminals and a stripe pattern of opening 150 μm in pitch and 30 μm in width.

After the exposure, the development thereof was performed using an aqueous solution of 0.2% sodium carbonate to thereby obtain a stripe pattern 150 μm in pitch and 30 μm in width, and a pattern of terminals to be led out from the stripe pattern.

A barrier rib paste for sand blast (PLS-3550; Nippon Denki Gaishi Co., Ltd.) was coated on the surface of glass substrate (bearing thereon the resist pattern which was formed on the aforementioned barrier rib paste) to a thickness of 180 μm by means of screen printing method.

Then, a sand blast-resisting dry film resist (BF-703; Tokyo Ohka Kogyo, Co., Ltd.) having a thickness of 25 μm was laminated thereon.

Then, for the purpose of forming a barrier rib pattern, the dry film resist was subjected to a exposure at 200 mJ/cm$^2$ by making use of a high-pressure mercury lamp and through a photomask having a stripe pattern of opening 150 μm in pitch and 50 μm in width.

By the way, in this exposure step, the position of exposure was off-set by a pitch of 75 μm in the lateral direction of the stripe from the position of the exposure of the aforementioned electrode pattern.

After the exposure, the development thereof was performed using an aqueous solution of 0.2% sodium carbonate to thereby obtain a resist pattern 150 μm in pitch and 50 μm in width.

By making use of a sand blast device (Fuji Seisakusho, Co., Ltd.), the substrate bearing the resist pattern was worked so as to erase a redundant portion of the barrier rib paste to a depth where the dry film resist which was formed in the beginning was existed, thereby molding the barrier rib paste into a U-shaped configuration.

Thereafter, by making use of a BF releasing solution (Tokyo Ohka Kogyo, Co., Ltd.), the resist was removed, and then, the resultant substrate was washed with water and dried.

Since the resist which was patterned in the beginning was also removed due to the aforementioned removal of resist, a recessed portion for disposing an electrode was formed in the bottom of the U-shaped structure constituting the barrier ribs.

Figure 1:
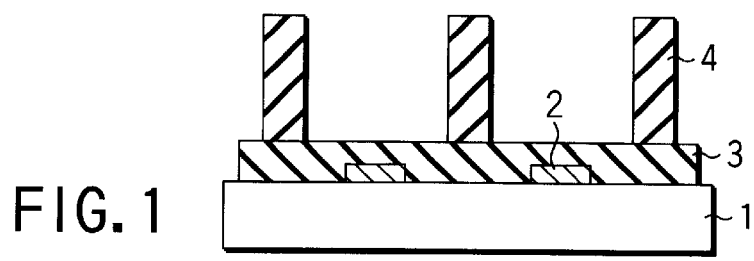
FIG. 1 is a cross-sectional view showing the back plate of ordinary plasma display substrate.
Figure 2:
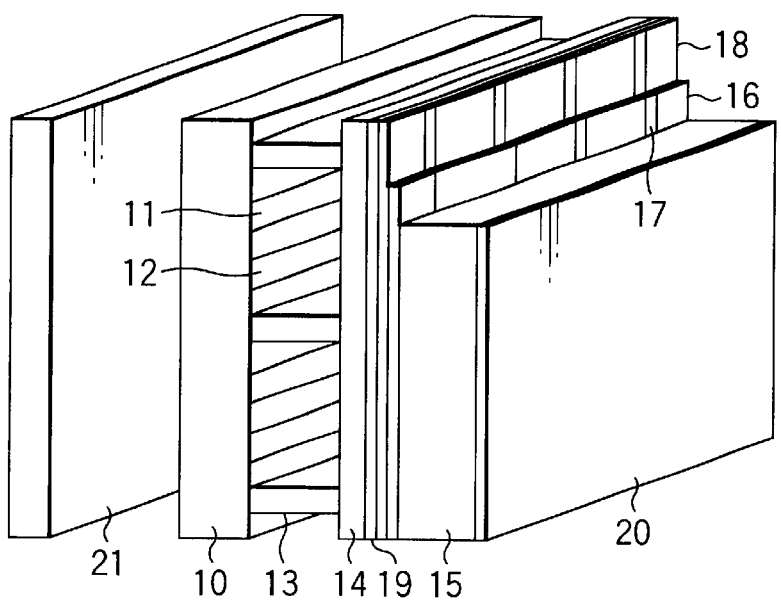
FIG. 2 is a perspective view illustrating the structure of plasma addressed liquid crystal display panel.
Figure 3:
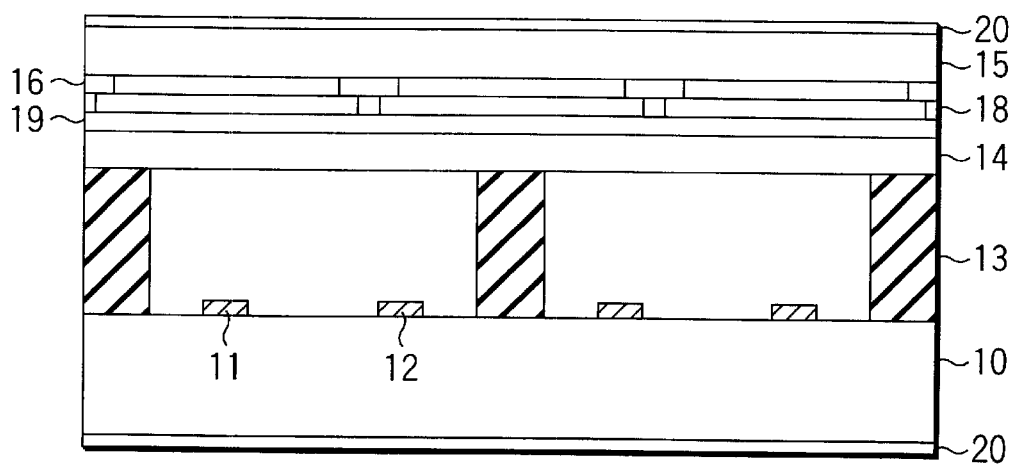
FIG. 3 is a cross-sectional view illustrating the structure of plasma addressed liquid crystal display panel.
Figure 4:
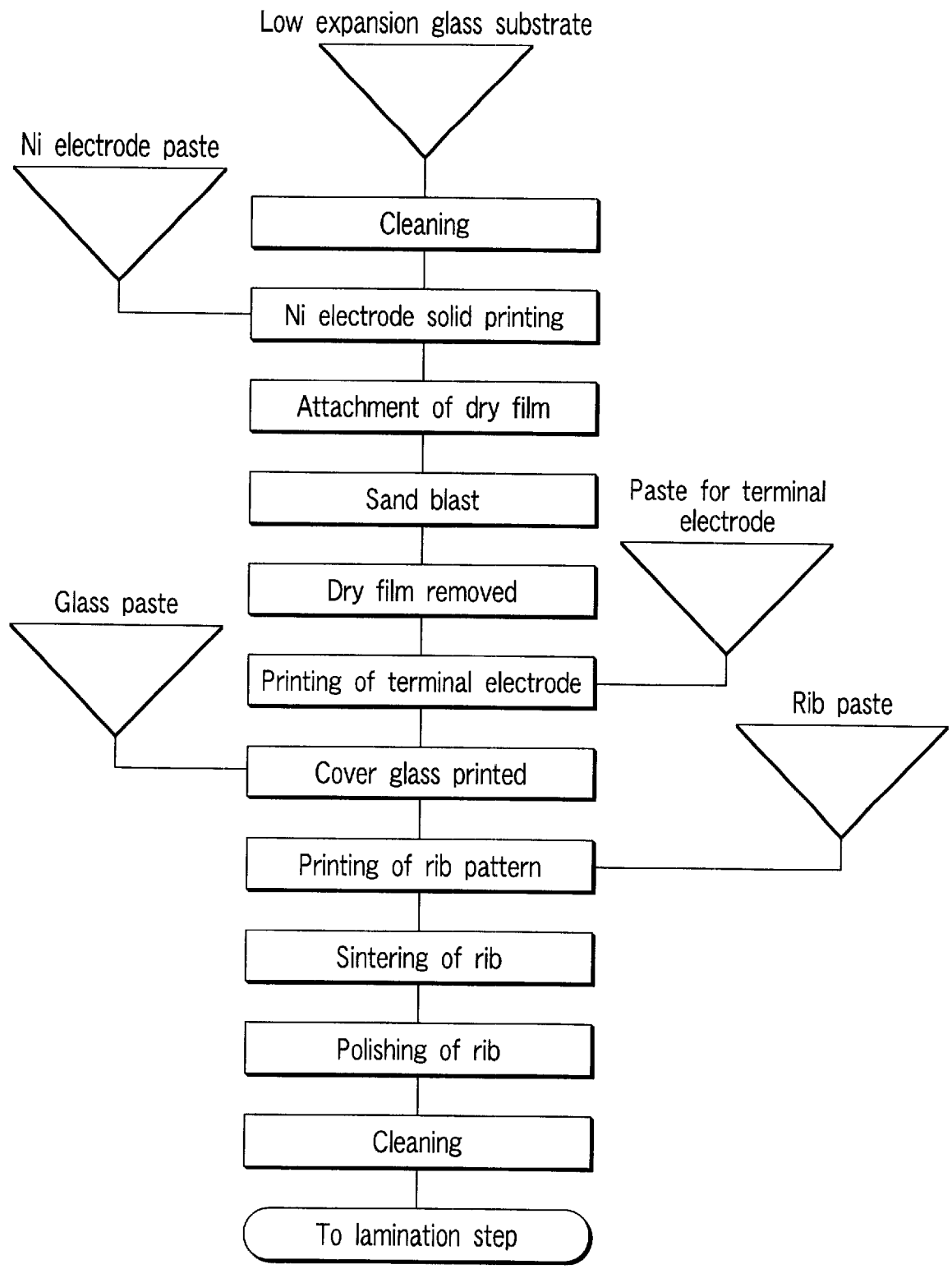
FIG. 4 is a block diagram for illustrating the manufacturing steps of the back plate of the conventional plasma addressed liquid crystal display panel.
Figure 5:
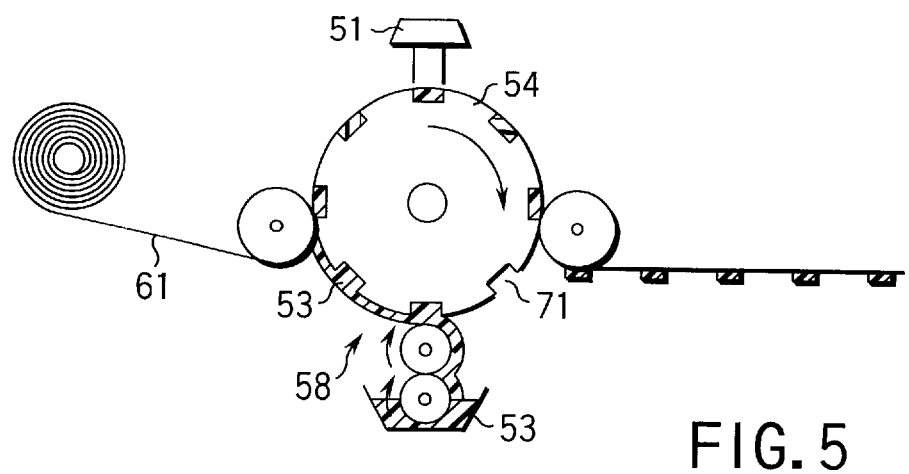
FIGS. 5 to 7 illustrate the conventional method of forming the barrier ribs and the configuration of the barrier ribs of the conventional plasma addressed liquid crystal display panel.
Figure 6:
Figure 7:
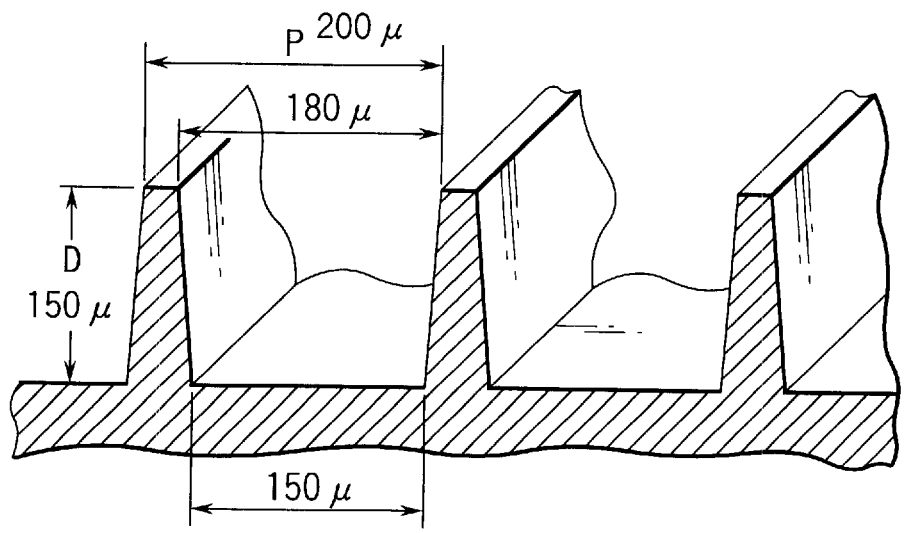
Figure 8:
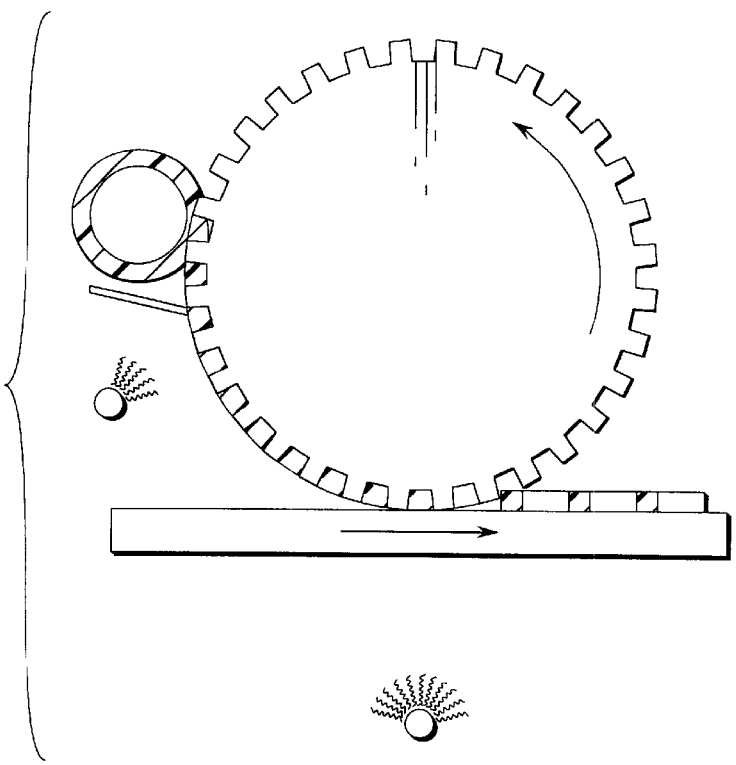
FIG. 8 is a schematical view illustrating the conventional method of forming the barrier ribs of the plasma addressed liquid crystal display panel.

The substrate from which the resist had been removed was then sintered in a hot-air sintering furnace at a temperature of 580° C. for 20 minutes to obtain barrier ribs constituting a U-shaped structure having in its bottom a recessed portion for disposing an electrode as shown in FIG. 3.

Then, a photosensitive silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

In order to form an electrode pattern, upon finishing the drying of the silver paste, the dry film resist was subjected to an exposure at 200 mJ/cm$^2$ by making use of a high-pressure mercury lamp and through a photomask having a pattern of electrode-lead-out terminals and a stripe pattern of opening 150 μm in pitch and 30 μm in width.

After the exposure, the development thereof was performed using an aqueous solution of 0.2% sodium carbonate to thereby obtain a stripe pattern 150 μm in pitch and 30 μm in width, and a pattern of terminals to be led out from the stripe pattern.

The substrate bearing the electrode pattern was sintered in a hot-air sintering furnace at a temperature of 550° C. for 20 minutes to obtain electrodes.

Then, a dielectric paste (NP-7972J; Noritake Co., Ltd.) was coated all over the substrate bearing the electrodes by means of screen printing. In this coating step, the attack angle of squeegee was set to 20 degrees.

The substrate coated with the dielectric material was sintered in a hot-air sintering furnace at a temperature of 530° C. for 20 minutes to obtain a substrate having barrier ribs, electrodes and a dielectric layer as shown in FIG. 18.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

When the substrate thus obtained was evaluated, the generation of short circuit between electrodes was not recognized. Further, neither the twisting nor collapsing of barrier ribs could not be recognized.

Furthermore, the relative positional relationship between the electrode and the barrier ribs was constant all over the entire plane, and the center in the lateral direction of the electrode was disposed at a position which was off-set in the lateral direction of the stripe from the center in the lateral direction of the barrier ribs by a distance of 75 μm.

EXAMPLE 11

A barrier rib paste for sand blast (PLS-3550; Nippon Denki Gaishi Co., Ltd.) was coated on the surface of glass substrate to a thickness of 20 μm by means of screen printing method.

Then, a sand blast-resisting dry film resist (BF-703; Tokyo Ohka Kogyo, Co., Ltd.) having a thickness of 25 μm was laminated thereon.

Then, for the purpose of forming an electrode arrangement portion, the dry film resist was subjected to an exposure at 200 mJ/cm$^2$ by making use of a high-pressure mercury lamp and through a photomask having a pattern of electrode-lead-out terminals and a stripe pattern of opening 150 μm in pitch and 100 μm in width.

After the exposure, the development thereof was performed using an aqueous solution of 0.2% sodium carbonate to thereby obtain a stripe pattern 150 μm in pitch and 100 μm in width, and a pattern of terminals to be led out from the stripe pattern.

Additionally, a barrier rib paste was coated on the surface of substrate to a thickness of 25 μm by means of screen printing method.

Thereafter, only a region inner than the pattern of terminals is selectively coated again with the barrier rib paste by means of screen printing method, thus forming a layer having a thickness of 160 μm.

Then, a sand blast-resisting dry film resist (BF-703; Tokyo Ohka Kogyo, Co., Ltd.) having a thickness of 25 μm was laminated entirely on the surface of substrate.

Then, for the purpose of forming a barrier rib pattern, the dry film resist was subjected to an exposure at 200 mJ/cm$^2$ by making use of a high-pressure mercury lamp and through a photomask having a stripe pattern of opening 150 μm in pitch and 50 μm in width.

By the way, in this exposure step, the position of exposure was off-set by a pitch of 75 μm in the lateral direction of the stripe from the position of the exposure of the aforementioned electrode pattern.

After the exposure, the development thereof was performed using an aqueous solution of 0.2% sodium carbonate to thereby obtain a resist pattern 150 μm in pitch and 50 μm in width.

By making use of a sand blast device (Fuji Seisakusho, Co., Ltd.), the substrate bearing the resist pattern was worked so as to erase a redundant portion of the barrier rib paste to a depth where the dry film resist which was formed in the beginning was existed, thereby molding the barrier rib paste into a U-shaped configuration.

Thereafter, by making use of a BF releasing solution (Tokyo Ohka Kogyo, Co., Ltd.), the resist was removed, and then, the resultant substrate was washed with water and dried.

The substrate from which the resist had been removed was then sintered in a hot-air sintering furnace at a temperature of 580° C. for 20 minutes to obtain barrier ribs having a U-shaped structure and a recessed portion for the terminal as shown in FIG. 19.

Then, a silver paste was applied to the barrier ribs to thereby fill it in the recessed portion by making use of an ink jet printer.

The substrate bearing the electrode pattern was sintered in a hot-air sintering furnace at a temperature of 550° C. for 20 minutes to obtain electrodes.

Then, a dielectric paste (NP-7972J; Noritake Co., Ltd.) was coated all over the substrate bearing the electrodes by means of screen printing. In this coating step, the attack angle of squeegee was set to 20 degrees.

The substrate coated with the dielectric material was sintered in a hot-air sintering furnace at a temperature of 530° C. for 20 minutes to obtain a substrate as shown in FIG. 19.

EXAMPLE 12

According to the same process as explained in Example 8, barrier ribs each having a U-shaped structure were prepared.

Then, a 42-6 alloy wire (42 wt. % Ni-6 wt. % Cr-52 wt. % Fe) having a diameter of 30 μm was employed as an electrode and disposed at the bottom portion inside the recessed portion.

Then, a dielectric paste (NP-7972J; Noritake Co., Ltd.) was coated all over the substrate bearing the electrodes by means of screen printing. In this coating step, the attack angle of squeegee was set to 20 degrees.

The substrate coated with the dielectric material was sintered in a hot-air sintering furnace at a temperature of 530° C. for 20 minutes to obtain a plasma display substrate as shown in FIG. 20.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

EXAMPLE 13

According to the same process as explained in Example 10, barrier ribs each having a recessed portion which was formed in the bottom inside a U-shaped structure were prepared.

Then, a 42-6 alloy wire (42 wt. % Ni-6 wt. % Cr-52 wt. % Fe) having a diameter of 30 μm was employed as an electrode and fitted in the recessed portion which was formed in the bottom inside the U-shaped structure.

Then, a dielectric paste (NP-7972J; Noritake Co., Ltd.) was coated all over the substrate bearing the electrodes by means of screen printing. In this coating step, the attack angle of squeegee was set to 20 degrees.

The substrate coated with the dielectric material was sintered in a hot-air sintering furnace at a temperature of 530° C. for 20 minutes to obtain a plasma display substrate as shown in FIG. 21.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

EXAMPLE 14

A barrier rib paste for sand blast (PLS-3550; Nippon Denki Gaishi Co., Ltd.) was coated on the surface of glass substrate to a thickness of 70 μm by means of screen printing method.

Then, a sand blast-resisting dry film resist (BF-703; Tokyo Ohka Kogyo, Co., Ltd.) having a thickness of 25 μm was laminated thereon.

Then, for the purpose of forming an electrode arrangement portion, the dry film resist was subjected to an exposure at 200 mJ/cm$^2$ by making use of a high-pressure mercury lamp and through a photomask having a pattern of electrode-lead-out terminals and a stripe pattern of opening 150 μm in pitch and 100 μm in width.

After the exposure, the development thereof was performed using an aqueous solution of 0.2% sodium carbonate to thereby obtain a stripe pattern 150 μm in pitch and 100 μm in width, and a pattern of terminals to be led out from the stripe pattern.

Additionally, a barrier rib paste was coated on the surface of substrate to a thickness of 25 μm by means of screen printing method.

Thereafter, only a region inner than the pattern of terminals is selectively coated again with the barrier rib paste by means of screen printing method, thus forming a layer having a thickness of 160 μm.

Then, a sand blast-resisting dry film resist (BF-703; Tokyo Ohka Kogyo, Co., Ltd.) having a thickness of 25 μm was laminated entirely on the surface of substrate.

Then, for the purpose of forming a barrier rib pattern, the dry film resist was subjected to an exposure at 200 mJ/cm$^2$ by making use of a high-pressure mercury lamp and through a photomask having a stripe pattern of opening 150 μm in pitch and 50 μm in width.

By the way, in this exposure step, the position of exposure was off-set by a pitch of 75 μm in the lateral direction of the stripe from the position of the exposure of the aforementioned electrode pattern.

After the exposure, the development thereof was performed using an aqueous solution of 0.2% sodium carbonate to thereby obtain a resist pattern 150 μm in pitch and 50 μm in width.

By making use of a sand blast device (Fuji Seisakusho, Co., Ltd.), the substrate bearing the resist pattern was worked so as to erase a redundant portion of the barrier rib paste to a depth where the dry film resist which was formed in the beginning was existed, thereby molding the barrier rib paste into a U-shaped configuration.

Thereafter, by making use of a BF releasing solution (Tokyo Ohka Kogyo, Co., Ltd.), the resist was removed, and then, the resultant substrate was washed with water and dried.

The substrate from which the resist had been removed was then sintered in a hot-air sintering furnace at a temperature of 580° C. for 20 minutes. As a result, both of the thickness and width of barrier rib were reduced to about 80% of those before the sintering thereof, and hence the barrier ribs having a U-shaped structure about 55 μm in thickness at the bottom thereof and 40 μm in width at an upper portion thereof were obtained.

Then, a photosensitive silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

In order to form an electrode pattern, upon finishing the drying of the silver paste, the dry film resist was subjected to an exposure at 200 mJ/cm$^2$ by making use of a high-pressure mercury lamp and through a photomask having a pattern of electrode-lead-out terminals and a stripe pattern of opening 150 μm in pitch and 30 μm in width.

The substrate bearing the electrode pattern was sintered in a hot-air sintering furnace at a temperature of 550° C. for 20 minutes to obtain electrodes.

Then, a dielectric paste (NP-7972J; Noritake Co., Ltd.) was coated on the substrate bearing the electrodes by means of screen printing, thereby filling recessed portions of barrier ribs.

In this coating step, the attack angle of squeegee was set to 20 degrees.

The substrate coated with the dielectric material was sintered in a hot-air sintering furnace at a temperature of 530° C. for 20 minutes to obtain a substrate as shown in FIG. 22.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

When the substrate thus obtained was evaluated, the generation of short circuit between electrodes was not recognized. Further, neither the twisting nor collapsing of barrier ribs could not be recognized.

EXAMPLE 15

An intaglio having a configuration which corresponds to a reversed configuration of barrier ribs and of electrode portions was employed as means for forming the barrier ribs. Then, a barrier rib paste was filled in the intaglio, and the paste filled in this manner was transferred to a substrate.

As a result, a molded body 50 μm in width of an upper portion of U-shaped structure, and 70 μm in thickness at a recessed portion formed in the bottom of U-shaped structure was obtained.

Thereafter, when the molded body was sintered, both of the thickness and width of barrier rib were reduced to about 80% of those before the sintering thereof, and hence the barrier ribs having a U-shaped structure about 55 μm in thickness at the recessed portion formed in the bottom thereof and 40 μm in width at an upper portion thereof were obtained.

Then, an alkali-soluble silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

Upon finishing the drying of the silver paste, an aqueous solution of 0.2% sodium carbonate was sprayed so as to remove all of the silver paste except the portion of silver paste which was filled in the recessed portion formed in the bottom of the U-shaped structure by taking advantage of a difference in thickness of silver paste between that formed on the bottom of the U-shaped structure and that formed on the recessed portion formed in the bottom of the U-shaped structure, thereby leaving the silver paste only in the recessed portion, thus forming an electrode pattern.

Then, the substrate was sintered in a hot-air sintering furnace at a temperature of 550° C. for 20 minutes to obtain electrodes.

Then, a dielectric paste (NP-7972J; Noritake Co., Ltd.) was coated on the substrate bearing the electrodes by means of screen printing, thereby filling recessed portions of barrier ribs. In this coating step, the attack angle of squeegee was set to 20 degrees.

The substrate coated with the dielectric material was sintered in a hot-air sintering furnace at a temperature of 530° C. for 20 minutes to obtain a substrate as shown in FIG. 23.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

EXAMPLE 16

An intaglio having a configuration which corresponds to a reversed configuration of barrier ribs was employed as means for forming the barrier ribs. Then, a barrier rib paste was filled in the intaglio, and the paste filled in this manner was transferred to a substrate.

As a result, a molded body 50 μm in width of an upper portion of U-shaped structure, and 50 μm in thickness at the bottom of U-shaped structure was obtained.

Thereafter, when the molded body was sintered, both of the thickness and width of barrier rib were reduced to about 80% of those before the sintering thereof, and hence the barrier ribs having a U-shaped structure about 40 μm in thickness at the bottom thereof and 40 μm in width at an upper portion thereof were obtained.

Then, a photosensitive silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

In order to form an electrode pattern, upon finishing the drying of the silver paste, the dry film resist was subjected to an exposure at 200 mJ/cm² by making use of a high-pressure mercury lamp and through a photomask having a pattern of electrode-lead-out terminals and a stripe pattern of opening 150 μm in pitch and 30 μm in width.

Then, the substrate bearing the electrode pattern was sintered in a hot-air sintering furnace at a temperature of 550° C. for 20 minutes to obtain electrodes.

Then, a dielectric paste (NP-7972J; Noritake Co., Ltd.) was coated on the substrate bearing the electrodes by means of screen printing, thereby filling recessed portions of barrier ribs. In this coating step, the attack angle of squeegee was set to 20 degrees.

The substrate coated with the dielectric material was sintered in a hot-air sintering furnace at a temperature of 530° C. for 20 minutes to obtain a substrate as shown in FIG. 24. In this case, the thickness only of the dielectric material was about 10 μm, but when it was combined with the dielectric material which was filled in the recessed portion formed in the bottom of U-shaped structure of barrier rib, the total thickness was about 50 μm.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

EXAMPLE 17

An intaglio having a configuration which corresponds to a reversed configuration of barrier ribs and of electrodes was employed as means for forming the barrier ribs. Then, a barrier rib paste was filled in the intaglio, and the paste filled in this manner was transferred to a substrate.

As a result, a molded body 50 μm in width of an upper portion of U-shaped structure, and 50 μm in thickness at the bottom of U-shaped structure was obtained.

Thereafter, when the molded body was sintered, both of the thickness and width of barrier rib were reduced to about 80% of those before the sintering thereof, and hence the barrier ribs having a U-shaped structure about 40 μm in thickness at the bottom thereof and 40 μm in width at an upper portion thereof were obtained.

Then, an alkali-soluble silver paste (FODEL DC202; DuPont Co., Ltd.) was coated all over the substrate by means of screen printing so as to fill the interior of barrier ribs with the paste.

In this coating step, the attack angle of squeegee was set to 20 degrees.

Upon finishing the drying of the silver paste, aqueous solution of 0.2% sodium carbonate was sprayed so as to remove all of the silver paste except the portion of silver paste which was filled in the recessed portion formed in the bottom of the U-shaped structure by taking advantage of a difference in thickness of silver paste between that formed on the bottom of the U-shaped structure and that formed on the recessed portion formed in the bottom of the U-shaped structure, thereby leaving the silver paste only in the recessed portion, thus forming an electrode pattern.

Then, the substrate was sintered in a hot-air sintering furnace at a temperature of 550° C. for 20 minutes to obtain electrodes.

Then, a dielectric paste (NP-7972J; Noritake Co., Ltd.) was coated on the substrate bearing the electrodes by means of screen printing, thereby filling recessed portions of barrier ribs. In this coating step, the attack angle of squeegee was set to 20 degrees.

The substrate coated with the dielectric material was sintered in a hot-air sintering furnace at a temperature of 530° C. for 20 minutes to obtain a substrate as shown in FIG. 25, wherein the thickness only of the dielectric material was about 10 μm, but when it was combined with the dielectric material which was filled in the recessed portion formed in the bottom of U-shaped structure of barrier rib, the total thickness was about 50 μm.

Thereafter, red, green and blue phosphors were applied to this substrate by means of screen printing, and the resultant substrate was sintered to accomplish the back substrate. Thereafter, transparent electrodes, bus electrodes, transparent dielectric layer and an MgO protective coat were successively formed on a glass substrate to prepare a front substrate. Then, these back and front substrates were superimposed, and the resultant composite body was subjected to evacuation and gas charging, thereby manufacturing a plasma display panel.

As explained above, according to the second aspect of the present invention, the following effects can be obtained.

(1) It is possible to obtain a plasma display panel having a barrier rib which can be hardly collapsed even if the width thereof is narrowed.

(2) It is possible to obtain a plasma display panel where the leak of luminescence to the rear side of back substrate can be minimized.

(3) It is possible to obtain a plasma display panel where the positional relationship between the electrode and barrier ribs is accurate.

(4) It is possible to obtain a plasma display panel where the disconnection and short circuit of electrodes can be minimized.

Next, a third aspect of the present invention will be explained.

Figure 26:
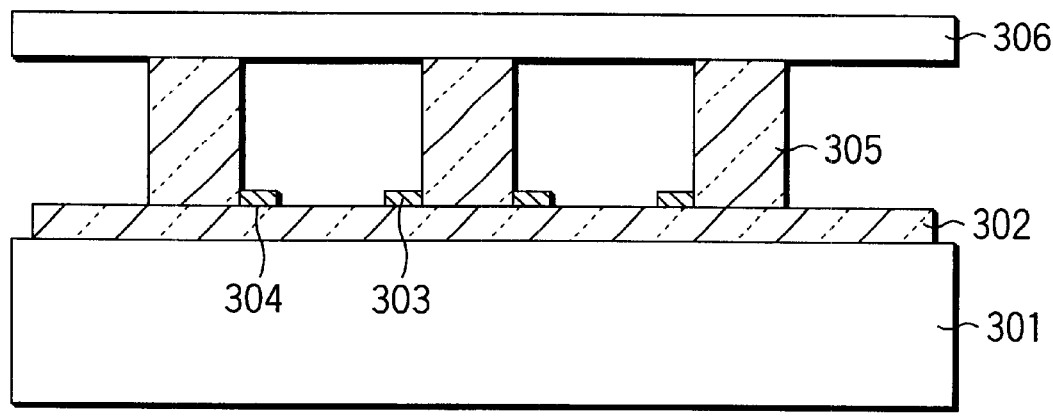
FIG. 26 is a drawing illustrating the structure of the plasma addressed liquid crystal display panel according to a third aspect of the present invention.
Figure 27:
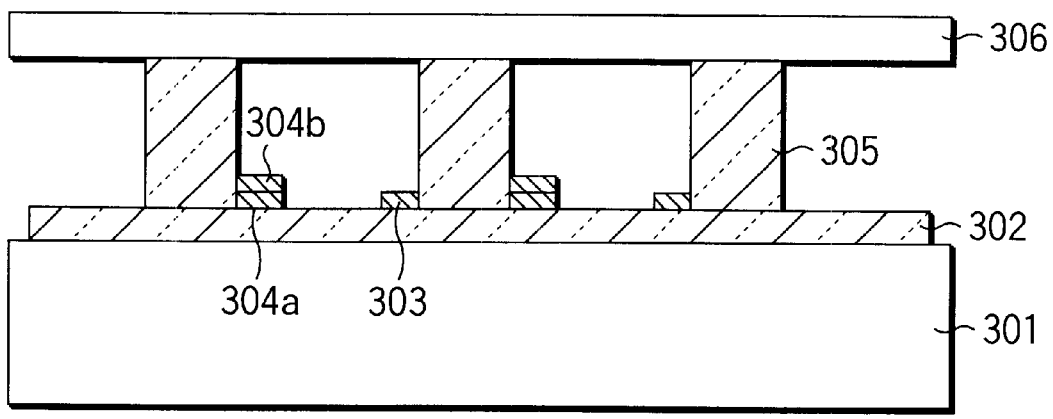
FIG. 27 is a drawing illustrating the structure of another example of the plasma addressed liquid crystal display panel according to a third aspect of the present invention.

According to this third aspect of the present invention, as shown in FIGS. 26 and 27, anodes 303, cathodes 304 and transparent barrier ribs 305 are disposed via a transparent dielectric material 302 on a glass back substrate 301, and a thin glass plate 306 is placed over these components, thus sealing these components, thereby forming a plasma addressed liquid crystal display panel. In this case, the back plate of the plasma addressed liquid crystal display panel is featured in that the transparent barrier ribs 305 and the transparent dielectric material 302 are formed of the same material.

In this back plate of the plasma addressed liquid crystal display panel, the film thickness of the transparent dielectric material may be in the range of 3 to 15 µm.

By the way, "transparent" in these transparent barrier ribs and transparent dielectric material means that the permeability of these materials to back light is 95% or more when they are formed into a dielectric layer.

Further, the angle between the sidewall of the transparent barrier rib and the glass back substrate may be set within the range of 85 to 95 degrees. If this angle falls outside the range of 85 to 95 degrees, the plane of polarization is caused to rotate and hence the contrast would be undesirably deteriorated.

Further, the surface roughness of the transparent barrier rib can be controlled within 1 µm, i.e. almost the optical flat surface. If the surface roughness thereof can be controlled within 1 µm, the scattering of light can be suppressed, thus enabling both of permeating light and reflection light to be effectively utilized. However, if the surface roughness thereof exceeds over 1 µm, the scattering of light at the surface of sidewall would become prominent, thus disturbing the plane of polarization, and hence the contrast would be undesirably deteriorated.

The anodes and cathode to be formed on the transparent dielectric layer can be constituted by the same material. When these anodes and cathode are constituted by the same material, the manufacturing process thereof can be preferably simplified.

As for the materials for constituting these anodes and cathode, a thick film or a plating material each containing 80% or more of Ni and exhibiting an excellent sputter resistance against the cations of discharge gas can be employed.

Materials containing 80% or more of Ni is preferable in terms of sputter resistance (i.e. resistance to sputtering). If the content of Ni is less than 80%, the sputter resistance of the material would be deteriorated, and at the same time, various problems such as an increase of electric resistance, non-uniformity of surface, and non-uniform discharge will be raised.

As for the materials for constituting these anodes and cathode, it is also possible to employ a thick film or a deposition film each containing 80% or more of Al and exhibiting an excellent sputter resistance against the cations of discharge gas.

Materials containing 80% or more of Al is preferable in terms of sputter resistance (i.e. resistance to sputtering). If the content of Al is less than 80%, the sputter resistance of the material would be deteriorated, and at the same time, various problems such as an increase of electric resistance, non-uniformity of surface, and non-uniform discharge will be raised.

Among these anode and cathode which are to be formed on the transparent dielectric layer, at least cathode may be formed of a two-layer structure as shown in FIG. 27.

Namely, when this two-layer structure is constituted by a first layer 304a which is formed of a material of low electric resistance, and a second layer 304b which is formed of a material having an excellent sputter resistance, the electric resistance of the two-layer structure can be decreased as a whole, thereby making it possible to make the electrode thinner and hence to increase the aperture ratio.

Further, these anode and cathode may be formed of the same material having a photosensitivity, and employed respectively as an underlying electrode. In this case, at least the cathode may be constructed such that it is provided thereon with a protective plating containing 80% or more of Ni and exhibiting an excellent sputter resistance against the cations of discharge gas.

Additionally, the underlying electrode can be formed using a photosensitive Ag paste. Since this photosensitive Ag paste is employed in large quantities at present in the production of plasma display panel, it would be advantageous in terms of cost, and more over, since the manufacturing process thereof is already established, it is advantageous in easiness in handling it.

According to this third aspect of the present invention, there is also provided a method of manufacturing a back plate of plasma addressed liquid crystal display panel. Namely, this method comprises the steps of coating a predetermined quantity of barrier rib-forming paste on a surface of glass substrate; forming a pattern of barrier ribs by pressing the barrier rib-forming paste layer by making use of a barrier rib-forming intagilo; heating the pattern of barrier ribs at a high temperature, thereby burning out existing organic components and concurrently sintering glass frit to thereby form transparent barrier ribs and a transparent dielectric layer; and subsequently forming a cathode and an anode on the transparent dielectric layer.

According to this third aspect of the present invention, there is also provided another method of manufacturing a back plate of plasma addressed liquid crystal display panel. Namely, this method comprises the steps of filling a barrier rib-forming paste containing glass frit in a barrier ribs-forming intaglio; superimposing a substrate on the barrier ribs-forming intaglio while keeping the configuration of the paste as it is to thereby transfer the paste onto the substrate; heating the pattern of barrier ribs, thereby burning out existing organic components and concurrently sintering glass frit to thereby form transparent barrier ribs and a transparent dielectric layer; and subsequently forming a cathode and an anode on the transparent dielectric layer.

As for the method of forming these anode and cathode, it is possible to employ an electroless plating method.

As for the method of forming these anode and cathode, it is also possible to employ a method which comprises the steps of: coating a thick film paste; coating a liquid photoresist; patterning the photoresist; forming an electrode pattern by means of sand blast; and sintering the electrode pattern.

It is also possible, as a method of forming these anode and cathode, to employ a photosensitive paste method.

It is also possible, as a method of forming these anode and cathode, to employ a vapor deposition method.

In the case where at least cathode is formed of a two-layer structure among these anode and cathode as mentioned above, it is possible to employ, as a method of forming the underlying electrode, a non-electrolytic plating method, a sand-blast method, a photosensitive paste method or a vapor deposition method, which is followed by an electrolytic plating using a material exhibiting an excellent sputter resistance to plasma cation to thereby form a protective plating layer.

In these methods of manufacturing the back plate of plasma addressed liquid crystal display panel, the deposition of glass paste for preventing the generation of abnormal discharging at the both ends of plasma cell can be performed at any time as long as it is performed after the step of forming the electrode pattern. If the electrodes are to be formed using a thick film paste, the sintering of the glass paste should preferably be performed concurrent with the sintering of the thick film paste for forming the electrodes in view of reducing the number of sintering step and of saving the manufacturing cost.

Further, if the electrodes are to be formed using a thick film paste, the coating of the thick film paste should be performed prior to the sintering of the barrier ribs, and the sintering of the barrier ribs and the electrodes should be performed concurrently in view of reducing the number of sintering step and of saving the manufacturing cost.

However, since the barrier ribs are mechanically fragile before the sintering thereof, the barrier ribs are required to be carefully handled before the sintering thereof. Therefore, it may be sometimes advisable, in view of total cost including the yield, to form the electrodes after finishing the preliminary sintering of the barrier ribs. Any ways, the process of forming the electrodes should be suitably selected taking these circumstances into consideration.

As for the materials for the electrodes, materials such as Ni, Al or lanthanum boride, which are excellent in resistance to the sputtering by the cation on the occasion of plasma etching, are desirable in view of the present operating conditions of panel such as the pulse of driving voltage, discharge current and the kinds of discharge gas. However, if it becomes possible in future to reduce the intensity and frequency of sputtering through the control of driving system, a metallic material such as Au, Ag, Cu, etc. or an alloy thereof can be employed as it is for the cathode. Therefore, the materials for the electrode should be suitably selected taking account of various conditions such as the easiness of patterning, the aperture ratio, the lead-out of terminals, the hermetic sealing properties relative to glass and the manufacturing cost.

As for the method of coating the Ni- or Al-thick film paste, it may be a solid printing by means of screen printing method, or a coating method using a die coater. As for the thick film paste, it may be those which are now developed for use in a plasma display panel. For example, it may be cathode type "Ni paste 9538" (DuPont, Co., Ltd.), cathode type "Ni paste NP9284" (Noritake, Co., Ltd.), or cathode type "Al paste NP9203" (Noritake, Co., Ltd.)

As for the method of coating the photosensitive electrode paste, it may be a solid printing by means of screen printing method, or a coating method using a die coater. As for the photosensitive electrode paste, it may be those which are now developed for use in a plasma display panel. For example, in the case of photosensitive Ag electrode, it may be alkali-development type "Fordel" (DuPont, Co., Ltd.), alkali-development type "TR2912" or "TR1952" (Taiyo Ink Manufacturing, Co., Ltd.), or water-development type "NP4701" (Noritake, Co., Ltd.).

As for the transparent barrier rib-forming material, it is possible to employ a paste-like material comprising a low melting point glass frit, a transparent inorganic aggregate and a binder. A solvent for adjusting viscosity may be added to the paste-like material for enabling the paste-like material to be coated on the glass substrate or to be filled in the barrier rib-forming intaglio. Depending on circumstances, the inorganic aggregate may not necessarily be employed.

As for the transparent inorganic aggregate, it is possible to employ $SiO_2$ powder, or $Al_2O_3$—$B_2O_3$—$SiO_2$ type glass powder. The mixing ratio of the transparent inorganic aggregate is preferably in the range of 5 to 30% by weight.

As for the method of curing the paste, while taking the transferring step into consideration, it can be performed by making use of, as a binder, a thermosetting resin or a photosensitive resin.

As for the barrier rib-forming intaglio, while taking the steps into consideration, a suitable kind of intaglio can be selected from a mold, a ceramic mold, an ionizing radiation-curable resin sheet intaglio and a silicone rubber intaglio.

For example, in the case of the barrier rib-forming intaglio which is employed in a method where a barrier rib-forming paste is coated on a glass substrate, and then, the coated layer is pressed by making use of a barrier rib-forming intaglio, it is preferable to employ a mold or a ceramic mold which is capable of withstanding the pressure of press on the occasion of molding the barrier rib-forming paste.

As for the mold, it can be manufactured by any suitable methods such as electronic engraving, etching, milling, rotary lathe machining, electroforming, etc. As for the ceramic mold, it can be manufactured by any suitable methods such as rotary lathe machining, slurry method, etc.

It would be effective, for the purpose of enhancing the releasability of molded product from mold after finishing the molding of barrier ribs, to apply a silicone film or a fluorine film to the surface of an intaglio such as a mold or a ceramic mold.

In the case of the barrier rib-forming intaglio which is employed in the aforementioned method where a barrier rib-forming paste is filled in a barrier rib-forming intaglio, it is possible to employ an ionizing radiation-curable resin sheet intaglio or a silicone rubber intaglio, other than the aforementioned mold or ceramic mold.

The aforementioned mold or ceramic mold is accompanied with a problem that the cost for manufacturing them is relatively high and hence is limited in terms of manufacturing capacity. Whereas in the cases of the ionizing radiation-curable resin sheet intaglio and silicone rubber intaglio, the replication thereof is relatively easy, so that they are suited for mass-production.

Specifically, these intaglios can be produced through the transfer thereof from a convex type matrix having the configuration of barrier ribs as explained below. Therefore, the convex type matrix is manufactured in conformity with a pattern of desired barrier ribs. Namely, the convex type matrix may be such that can be produced by lathing a metal roll into a configuration of barrier ribs, that can be produced by cutting a flat plate into a configuration of barrier ribs, or that can be produced by way of photolithography after adhering a dry film onto a flat substrate.

As for the method of coating a predetermined quantity of barrier rib-forming paste on a glass substrate, it may be a solid printing by means of screen printing method, or a coating method using a die coater. Alternatively, a material formed into a film may be laminated on the glass substrate. As for the method of press, the employment of a flat press or a roll press is preferable. For the purpose of preventing the entrapment of air bubbles, it may be effective to perform the press in a vacuum chamber.

After the paste has been cured by means of heat or ultraviolet rays, the cured paste is taken out of the mold and sintered to thereby simultaneously forming the transparent barrier ribs and the transparent dielectric layer. On this occasion, the thickness of the transparent dielectric layer is determined depending on the pressure and pressing time by the flat press or roll press, as well as on the hardness of the paste.

As it is correlated with the diameter of glass frit, if the thickness of the paste is smaller than 5 $\mu$m before sintering, a region where the paste is missing would be generated, or non-uniformity in thickness of the paste tends to be generated after the sintering. On the other hand, if the thickness of the paste is larger than 15 $\mu$m after sintering, the permeability would be deteriorated down to as low as 95%, thus deteriorating the utilization efficiency of the backlight.

Therefore, it is preferable to suitably determine the conditions of press and the composition of the barrier rib-forming paste so as to make the thickness of the transparent dielectric layer fall within the range of 3 to 15 $\mu$m after the sintering thereof.

As for the method of filling a predetermined quantity of the barrier rib-forming paste in the barrier rib-forming intaglio, it is possible to employ various coating methods, specific examples thereof including screen printing, die-coating, doctor blade coating, roll coating, roll press, flat press, etc. For the purpose of preventing the entrapment of air bubbles, it may be effective to perform the coating in a vacuum chamber.

On this occasion, the thickness of the transparent dielectric layer is determined depending on the rheological property of the paste, and on the magnitude of pressure and pressing speed of the coating. As it is correlated with the diameter of glass frit, if the thickness of the paste is smaller than 5 $\mu$m before curing, a region where the paste is missing would be generated, or non-uniformity in thickness of the paste tends to be generated after the sintering. On the other hand, if the thickness of the paste is larger than 15 $\mu$m after sintering, the permeability would be deteriorated down to as low as 95%, thus deteriorating the utilization efficiency of the backlight.

Therefore, it is preferable to suitably determine the conditions of press and the composition of the barrier rib-forming paste so as to make the thickness of the transparent dielectric layer fall within the range of 3 to 15 $\mu$m after the sintering thereof.

Then, the transfer of the paste onto the substrate is performed. In this case, any of the following methods can be selected, i.e. a method wherein the barrier rib-forming material is allowed to cure before the barrier rib-forming material is transferred onto the glass substrate; and a method wherein the barrier rib-forming material is allowed to contact with the glass substrate before the barrier rib-forming material is still in an uncured state, and under this condition, the barrier rib-forming material is allowed to cure.

In the case of the former transfer method, an adhesive or a self-adhesive is required to be interposed between the barrier rib-forming material and the glass substrate. In the case of the latter transfer method however, since the barrier rib-forming material is allowed to cure on the glass substrate 104, the adhesive or the self-adhesive is no longer required to be employed. However, the adhesive or the self-adhesive may be employed for the purpose of ensuring the transfer of pattern on the occasion of releasing the paste from the intaglio. The cured paste is then taken out of the intaglio and subjected to the sintering thereof, thus making it possible to simultaneously obtain the transparent barrier ribs and the transparent dielectric layer.

As explained above, according to this third aspect of the present invention, it is possible to form both of these transparent barrier ribs and transparent dielectric layer by making use of the same material. Finally, anodes and cathodes are formed on the surface of the transparent dielectric layer to accomplish the fabrication of the plasma addressed liquid crystal display panel.

The step of forming these electrodes can be performed prior to the step of sintering these transparent barrier ribs and transparent dielectric layer. However, in view of the stability in this step, the step of forming these electrodes should preferably be performed after the aforementioned sintering step.

As for the method of patterning the electrodes by means of non-electrolytic plating method on the occasion of forming these anodes and cathodes, the following methods can be preferably employed.

Namely, the first method is performed in such a way that after a non-electrolytic plating has been performed all over the surface of substrate, a liquid photoresist is coated thereon, and then, the exposure and development thereof are performed using a mask, after which a redundant portion of the plated film was etched away to obtain an electrode pattern.

The second method is performed in such a way that after a liquid photoresist is coated all over the surface of substrate, the exposure and development thereof are performed using a mask. Then, only the regions where a plating is required to be performed are removed, and a plating catalyst is coated all over the surface of substrate, after which the resist is peeled away so as to leave the plating catalyst only on the regions which correspond to the configuration of the electrode pattern. Thereafter, the plating of electrode of predetermined configuration is performed by means of non-electrolytic plating. Since the electrode pattern is formed by way of plating in this method, the sintering step is no longer required.

In the case where these anodes and cathodes are to be formed by a method wherein a thick film paste is employed, the coating of the thick film paste may be performed by means of screen printing method, solid printing method, or a coating method using a die coater. Meanwhile, the coating of liquid photoresist can be performed also by means of screen printing method, solid printing method, or a coating method using a die coater.

According to the aforementioned method, the exposure of the resist is performed using a glass mask at first, and then, the resist is developed to form a pattern, after which by taking advantage of the protection layer of resist, an electrode pattern is formed by means of sand blast. However, this sand blast may be replaced by a liquid honing. Finally, the sintering of the paste is performed to turn it into electrodes.

In the case where these anodes and cathodes are to be formed by a method wherein a photosensitive paste method is employed, a pattern may be formed through a glass mask exposure using an ordinary method, the pattern thus obtained being subsequently sintered to turn it into the electrodes.

In the case where the method of forming anodes and cathodes is constituted by a vapor deposition method, either a method of depositing an electrode pattern through a liquid photoresist masking a redundant region, or a method of depositing an electrode pattern through a metallic mask covering a redundant region can be preferably employed. Further, even if the masking of the sidewalls of transparent barrier ribs are insufficient, little problem will be raised, since there is a little possibility that due to the configuration of the transparent barrier ribs, metal vaporized can adhere to the sidewalls thereof. Even if the sidewalls of the barrier ribs are adhered with a thin layer of metal, only the redundant portion thereof can be easily removed using an etching solution. Since the electrodes are formed of a vapor deposition film, the sintering thereof is no longer required.

When an electrolytic plating method is employed, an ordinary electric current can be applied by taking advantage of the terminals of patterned electrodes, thereby making it possible to form a protective plated film only in the regions required. Since the electrodes are formed of a plated metal, the sintering thereof is no longer required.

As explained above, according to the third aspect of the present invention, the transparent barrier ribs and the transparent dielectric layer are formed in advance using the same material, and then, the anodes and the cathode are formed on the transparent dielectric layer to thereby accomplish the back plate of plasma display liquid crystal panel.

Next, examples according to the third aspect of the present invention will be explained as follows. It should be noted that these examples are not intended to limit the scope of the present invention.

EXAMPLE 18

Figure 28:
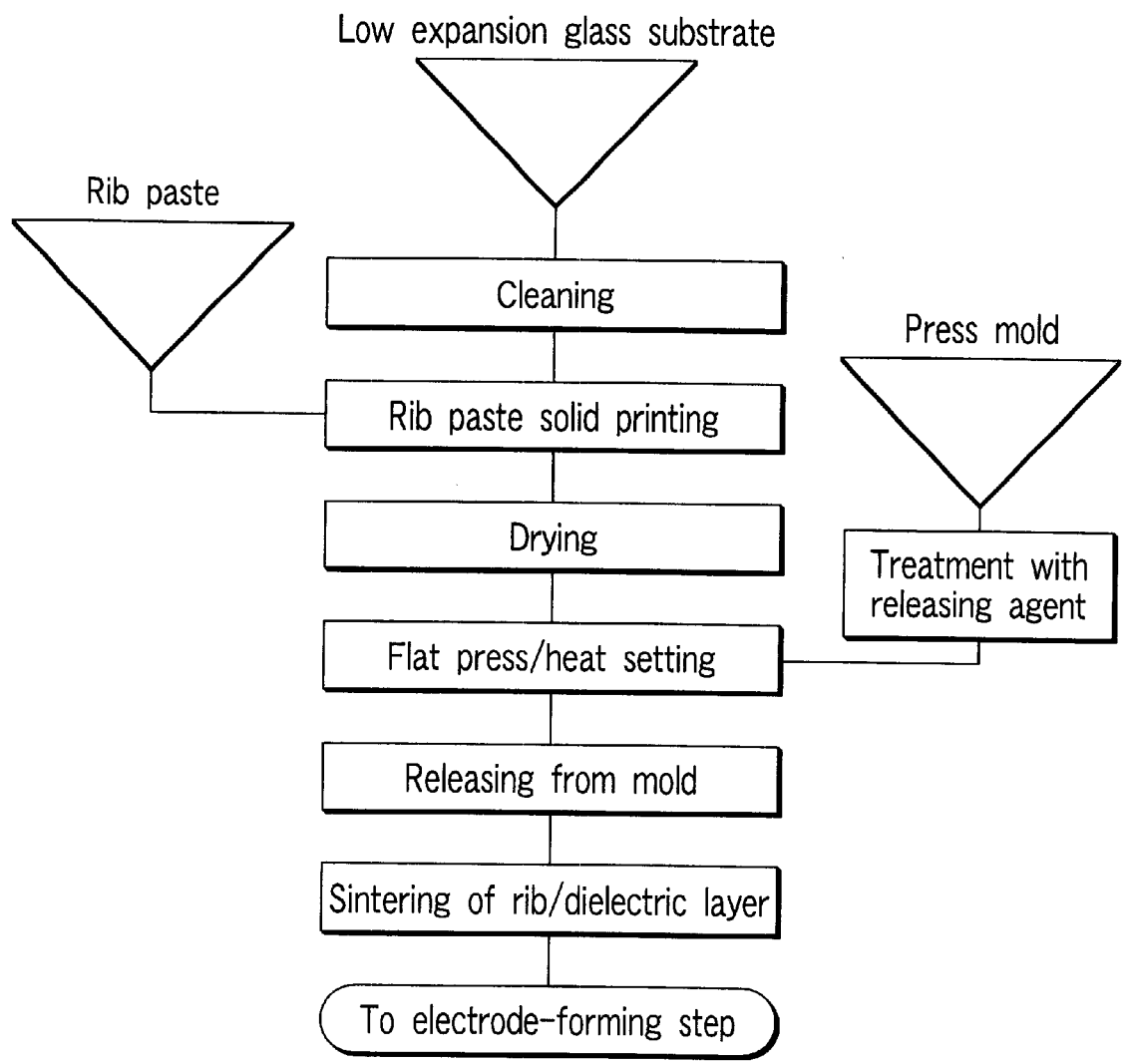
FIG. 28 is a drawing illustrating the step of manufacturing the transparent barrier ribs and dielectric layers according to a third aspect of the present invention.
Figure 29:
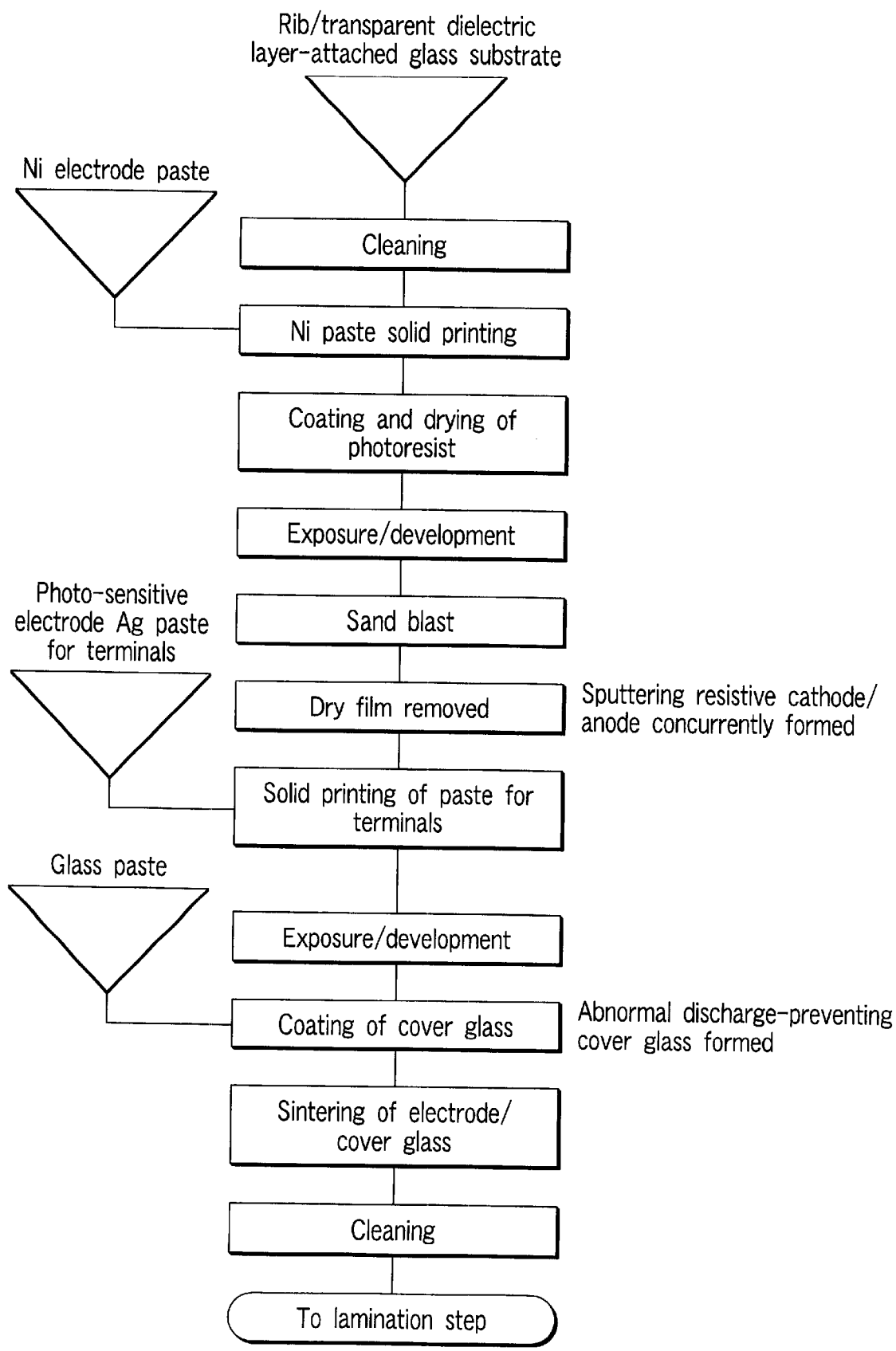
FIG. 29 is a drawing illustrating the step of manufacturing the electrodes according to a third aspect of the present invention.

The glass back substrate of 42-inch VGA plasma display liquid crystal panel having a panel structure as shown in FIG. 26 was manufactured by adopting the manufacturing method of transparent barrier ribs and dielectric layer shown in FIG. 28 and the manufacturing method of electrodes shown in FIG. 29. Followings are detailed explanation of the manufacturing steps of the panel.

Specifications of the barrier rib-forming intaglio:

The type of intaglio: Intaglio for press-molding;

The configuration of grooves: Stripe-shaped, 100 $\mu$m in width, 250 $\mu$m in depth and 1092 $\mu$m in pitch.

The surface of the intaglio was coated with fluororesin so as to improve the releasability thereof, the resultant intaglio being employed as a press mold.

The composition of barrier rib-forming paste:

| | |
|---|---|
| Low melting point glass frit (PbO—$B_2O_3$—$SiO_2$ type glass powder (3 $\mu$m or less)): | 70 parts by weight |
| Transparent inorganic aggregate ($Al_2O_3$—$B_2O_3$—$SiO_2$ type glass powder (1 $\mu$m or less)): | 10 parts by weight |
| Binder (ethyl cellulose): | 5 parts by weight |
| Binder (thermosetting epoxy resin): | 5 parts by weight |
| Viscosity adjusting solvent (butyl acetate carbitol): | 10 parts by weight |

This composition was fully kneaded by making use of a roll mill to thereby obtain a barrier rib-forming paste.

A heat resistance glass substrate provided with an exhaust pipe-connecting hole was washed and dried. Then, the aforementioned transparent barrier rib-forming paste was solid-coated on this glass substrate to a thickness of 30 $\mu$m by means of screen printing. Then this glass substrate was heated at a temperature of 120° C. to remove the solvent, thereby forming a uniform film having a thickness of 25 $\mu$m.

Then, by making use of the aforementioned mold having recessed portions, this film was flat-pressed at a pressure of 10 MPa. One minute later after the initiation of this flat press, the film was heated for two minutes at a temperature of 160° C. to thermally cure the epoxy resin. Then, the pressing was released, and the glass substrate was released from the press mold by making use of vacuum suction.

As a result, a configuration of transparent barrier rib 250 $\mu$m in height, 100 $\mu$m in width and 1092 $\mu$m in pitch was formed, and at the same time, a transparent dielectric layer having a thickness of 15 $\mu$m was formed. The resultant body was sintered in a sintering furnace for 30 minutes at a temperature of 600° C. As a result, it was possible to form smooth transparent barrier ribs each having a height of 200 $\mu$m, a width of 80 $\mu$m, a thickness of 1 $\mu$m or less, and extending upward at a angle of 88 degrees to the glass substrate, i.e. substantially perpendicular to the glass substrate.

Further, it was also possible to form a smooth film, i.e. a transparent dielectric layer having a thickness 12 $\mu$m and a permeability of 95%.

The glass substrate provided with the aforementioned transparent barrier ribs and transparent dielectric layer that had been sintered as mentioned above was then subjected to washing and drying. In this case, for the purpose of lowering the viscosity of the cathode Ni paste NP9284 (Noritake Co., Ltd.), 10% by weight of butyl acetate carbitol was added therein. The resultant Ni paste was solid-coated by means of screen printing method.

Since the viscosity was lowered in this manner, it was possible to substantially prevent the paste from adhering to the sidewall of the transparent barrier ribs, thus allowing the paste to be collected at the bottom portion of the transparent barrier ribs. Then, the paste was dried to form a Ni paste layer having a thickness of 60 $\mu$m.

Subsequently, a photosensitive liquid resist (OFPR800; Tokyo Ohka Kogyo Co., Ltd.) was coated thereon and dried, after which by making use of a glass mask and by keeping a proximity gap of 300 $\mu$m from the glass plane (a gap from the top of barrier rib is 100 $\mu$m), a parallel light was irradiated onto the surface of the substrate, which was followed by a development process to obtain a pattern.

By the way, the pattern to be obtained from the employment of this glass mask would become such that the width of electrode is 100 $\mu$m after the sintering. Further, since an abnormal discharge preventive cover glass was subsequently coated as explained hereinafter, it was designed such that a Ni thick film electrode could be formed at a region 5 mm inner than the edge of the barrier rib pattern.

Then, after a redundant portion of Ni electrode material was removed by means of sand blast method, the resist was peeled away. During this step, the Ni paste that had been adhered onto the sidewall could be completely removed. As a result, it was possible to obtain a stripe-shaped Ni electrode pattern which corresponded to the anode and the cathode in the discharge space.

Since it was difficult to perform a vacuum sealing with this Ni electrode, a Ag electrode to be provided for the sealing portion and for the terminal electrode portion was formed as follows. Namely, a photo-sensitive Ag electrode paste (TR2912; Taiyo Ink Co., Ltd.) was solid-coated by means of screen printing method in the regions including the end portion, sealing portion and terminal electrode portion of the aforementioned Ni thick film paste layer, thereby forming a Ag electrode paste layer having a thickness of 12 μm.

Thereafter, glass masks are aligned with each other while keeping a proximity therebetween, and the resultant surface was irradiated with a dosage of 500 mJ/cm$^2$. The electrode pattern of this glass mask included the end portion, sealing portion and terminal lead-out portion of the Ni thick film paste layer. By the way, the width of the electrode was 100 μm.

Next, by making use of a conveyer type spray developing machine, the development of electrode pattern was performed 5 minutes using an aqueous solution of 0.4 wt. % Na2CO$_3$ at a temperature of 23° C. and at a spray pressure of 0.1 MPa. Thereafter, the resultant surface was washed with water and dried, thereby obtaining a pattern.

Further, in order to prevent the generation of abnormal discharge at the edge portion of plasma cell, a cover glass paste was coated by means of screen printing at a zone 10 mm in width located 5 mm outside the edge of barrier ribs. Then, the resultant body was kept at a temperature of 580° C. for 30 minutes, thereby sintering the Ni paste, Ag paste and the cover glass paste.

By the way, the thickness of the Ni electrode after the sintering was 40 μm, the thickness of the Ag electrode after the sintering was about 6 μm, and the width of each of these electrodes was about 100 μm. The electric resistance was about 500 Ω with about 1000 mm including Ni of the discharge portion and Ag of the terminal portion. Therefore, as far as the electric resistance is concerned, it meets the specification thereof. Accordingly, it was possible to fabricate the plasma substrate as shown in FIG. 26.

EXAMPLE 19

Figure 30:
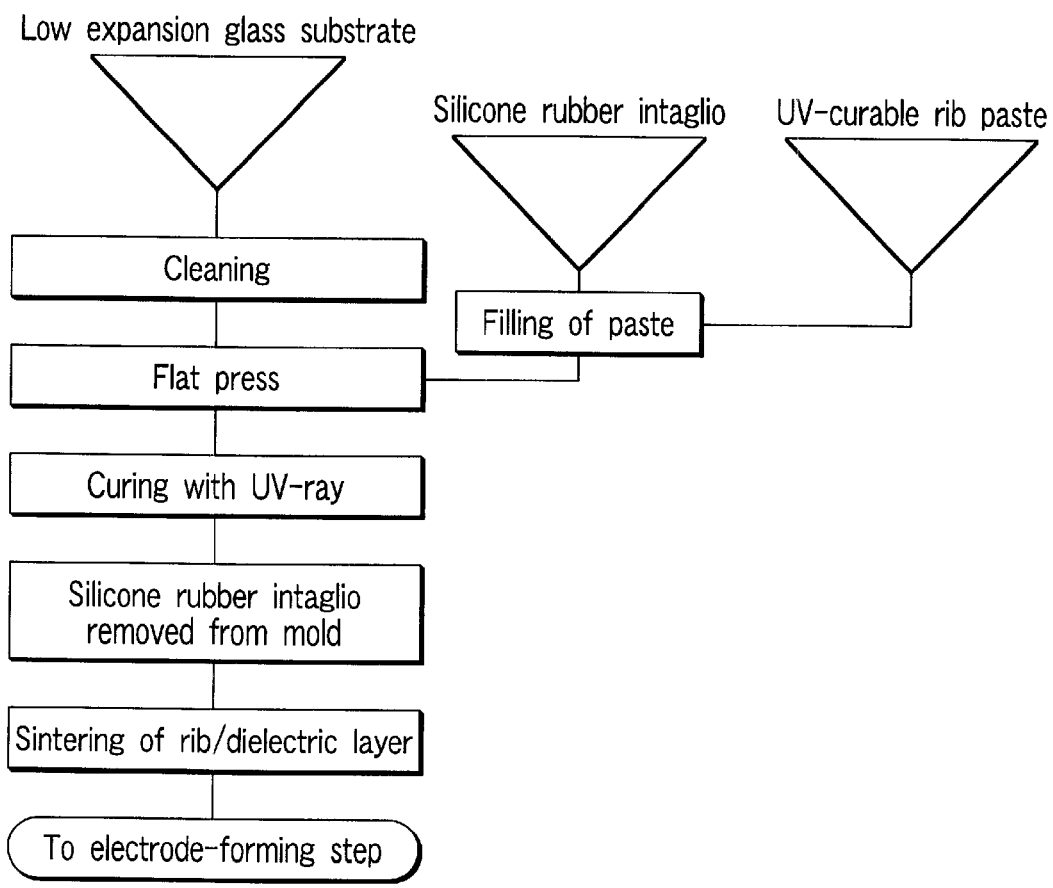
FIG. 30 is a drawing illustrating another manufacturing process of the transparent barrier ribs and dielectric layers according to a third aspect of the present invention.
Figure 31:
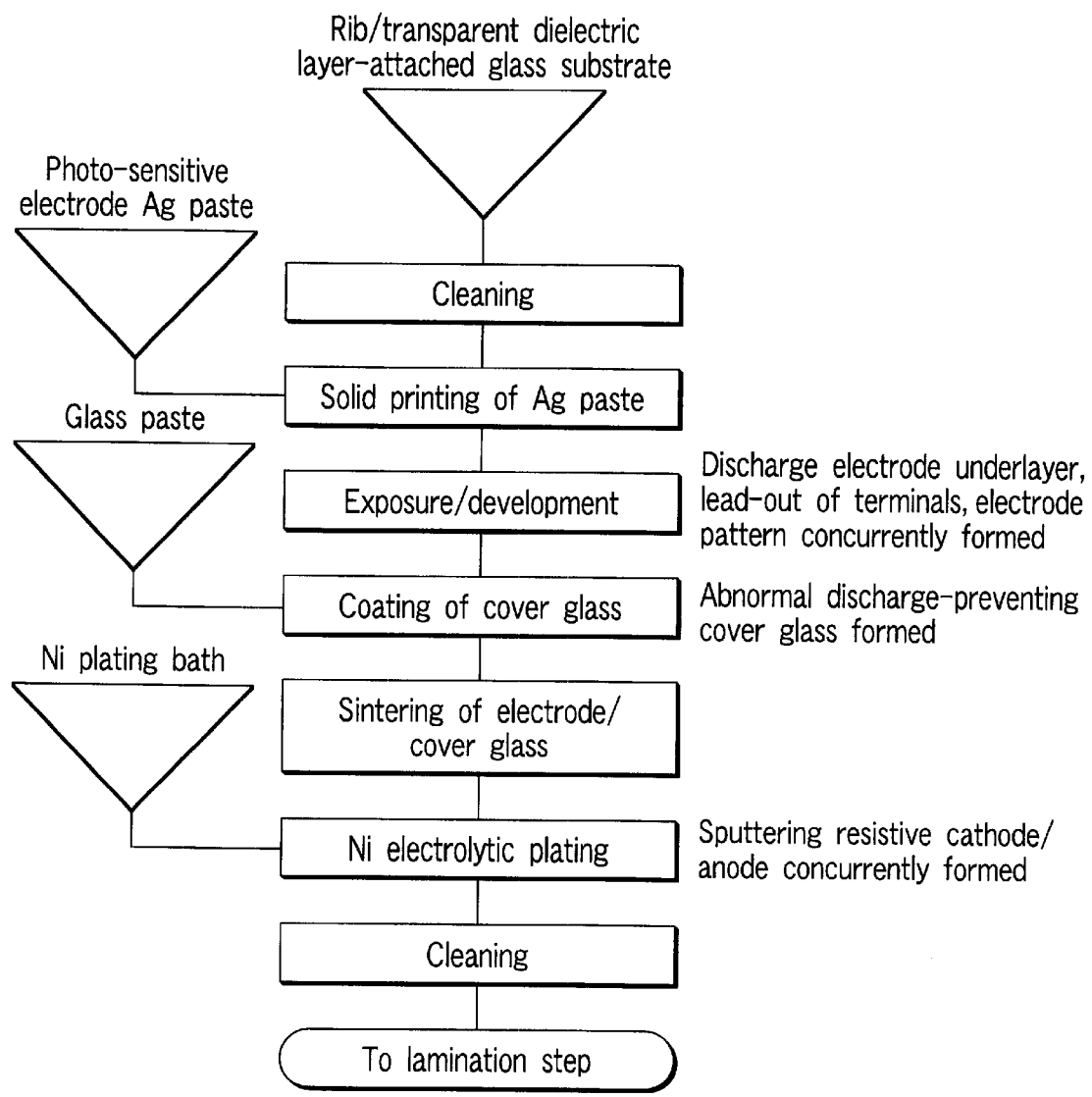
FIG. 31 is a drawing illustrating another manufacturing process of the electrodes according to a third aspect of the present invention.

The glass back substrate of 42-inch HDTV plasma display liquid crystal panel having a panel structure as shown in FIG. 27 was manufactured by adopting the manufacturing method of transparent barrier ribs and dielectric layer shown in FIG. 30 and the manufacturing method of electrodes shown in FIG. 31. Followings are detailed explanation of the manufacturing steps of the panel.

Specifications of the barrier rib-forming intaglio:

The type of intaglio: Plane type silicone rubber intaglio;

The configuration of grooves: Stripe-shaped, 60 μm in width, 250 μm in depth and 485 μm in pitch.

By taking advantage of the releasability of the silicone rubber intaglio, the intaglio was employed as a transferring intaglio.

The composition of barrier rib-forming paste:

| | |
|---|---|
| Low melting point glass frit (PbO—B$_2$O$_3$—SiO$_2$ type glass powder (3 μm or less)): | 70 parts by weight |
| Transparent inorganic aggregate (Al$_2$O$_3$—B$_2$O$_3$—SiO$_2$ type glass powder (1 μm or less)): | 10 parts by weight |
| Binder (UV-curing resin; diethylenegylcol dimethacrylate): | 8 parts by weight |
| Binder (UV-curing resin; 2-hydroxypropyl acrylate): | 6 parts by weight |
| Binder (initiator; benzophenone): | 1 parts by weight |
| Viscosity adjusting solvent (butyl acetate carbitol): | 5 parts by weight |

This composition was fully kneaded by making use of a roll mill to thereby obtain a barrier rib-forming paste.

A heat resistance glass substrate provided with an exhaust pipe-connecting hole was washed and dried. Then, the aforementioned transparent barrier rib-forming paste was filled in the above-described flat intaglio made of silicon rubber by making use of a doctor blade. As a result, the intaglio having a depth of 250 μm was filled with the paste without entrapping air bubbles, and at the same time, a film having a thickness of 7 μm which was designed to be formed into a transparent dielectric layer was formed. Subsequently, this intaglio was superimposed on the above-described glass substrate and flat-pressed at a pressure of 10 MPa.

Then, the laminated body consisting of the intaglio and the glass substrate was taken out of the pressing machine, and then, subjected, from the glass substrate side, to UV irradiation at a dosage of 500 mJ/cm$^2$ by making use of a UV irradiation device to UV-cure the barrier rib paste, the resultant silicone rubber intaglio being subsequently released from the glass substrate.

As a result, a configuration of transparent barrier rib 250 μm in height, 60 μm in width and 485 μm in pitch was formed, and at the same time, a transparent dielectric layer having a thickness of 7 μm was formed.

The resultant body was sintered in a sintering furnace for 30 minutes at a temperature of 600° C. As a result, it was possible to form smooth transparent barrier ribs each having a height of 200 μm, a width of 45 μm, a thickness of 1 μm or less, and extending upward at a angle of 88 degrees to the glass substrate, i.e. substantially perpendicular to the glass substrate.

Further, it was also possible to form a smooth film, i.e. a transparent dielectric layer having a thickness 5 μm and a permeability of 97%.

The glass substrate provided with the aforementioned transparent barrier ribs and transparent dielectric layer that had been sintered as mentioned above was then subjected to washing and drying. As for the photosensitive electrode paste, a photosensitive Ag electrode paste (TR2912; Taiyo Ink Co., Ltd.) was employed.

Then, this photosensitive Ag electrode paste was solid-coated by means of screen printing method, and dried to form a Ag electrode paste layer having a thickness of 12 μm.

Thereafter, by making use of a vertical exposure machine, glass masks are aligned with each other while keeping a proximity therebetween, and the resultant surface was irradiated with a dosage of 1000 mJ/cm$^2$. The electrode pattern of this glass mask included a lead-out portion and all of anode and cathode of the plasma cell portion. By the way, the width of the electrode of the plasma cell portion was 40 μm.

Next, by making use of a conveyer type spray developing machine, the development of electrode pattern was performed 5 minutes using an aqueous solution of 0.4 wt. % Na2CO₃ at a temperature of 23° C. and at a spray pressure of 0.1 MPa. Thereafter, the resultant surface was washed with water and dried, thereby obtaining a pattern.

Further, in order to prevent the generation of abnormal discharge at the edge portion of plasma cell, a cover glass paste was coated by means of screen printing at a zone 10 mm in width located 5 mm outside the edge of barrier ribs. Then, the resultant body was kept at a temperature of 580° C. for 30 minutes, thereby sintering the Ag paste and the cover glass paste.

By the way, the thickness of the Ag electrode after the sintering was 5 μm, and the width thereof was about 40 μm. The electric resistance was about 300 Ω with about 1000 mm. Therefore, as far as the electric resistance is concerned, it meets the specification thereof.

Further, for the purpose of protecting the discharging cathodes from the anion sputtering, a Ni layer having about 5 μm was formed on cathode portions of the plasma cell by means of electrolytic plating using a sulfamic acid Ni plating bath. As a result, cathodes each having a height of about 10 μm and a width of about 50 μm were obtained. Accordingly, it was possible to fabricate the plasma substrate as shown in FIG. 27. The aperture ratio was 80%, indicating an excellent result.

As explained above, when the barrier ribs and electrodes are formed by way of the manufacturing method of the third aspect of the present invention, the following effects can be obtained.

Namely, since the transparent barrier ribs are employed, the aperture ratio can be increased and the brightness of panel can be improved. Additionally, the viewing angle in the direction perpendicular to the barrier rib can be enlarged. Since it is possible to adopt a intaglio manufacturing method where the height of barrier ribs can be easily made uniform, the yield and stability in quality of product can be improved. Although it has been difficult to align the barrier ribs with the electrodes in the process using an intaglio, it is now possible according to this manufacturing method to obtain the panel which is excellent in alignment precision, since the electrodes are formed after the formation of the barrier ribs.

Next, the fourth aspect of the present invention will be explained with reference to the drawings.

According to this fourth aspect of the invention, there is provided a recessed and projected pattern-forming apparatus of rotary type for forming a cured recessed and projected pattern of an ionizing radiation-curable resin composition on the surface of a rigid plate such as a substrate to be employed for a plasma display or a plasma addressed liquid crystal display. This apparatus is featured as having the following mechanisms and structures (1) to (6).

(1) An intaglio-rotating roll provided on the surface thereof with a predetermined recessed and projected pattern constituted by a releasable surface;

(2) A pinching mechanism for enabling the ionizing radiation-curable resin composition to be continuously pinched between said intaglio-rotating roll and an ionizing radiation-permeable releasable film while keeping a predetermined thickness of said ionizing radiation-curable resin composition;

(3) An radiation irradiating mechanism for irradiating an ionizing radiation to said resin composition under the aforementioned pinched condition;

(4) A releasing mechanism for releasing said ionizing radiation-permeable releasable film from the surface of said intaglio-rotating roll after finishing the curing of said ionizing radiation-curable resin composition;

(5) A press mechanism which is designed such that said rigid plate is fed over said intaglio-rotating roll for enabling said rigid plate to be superimposed and aligned, at a predetermined precision, with said ionizing radiation-curable resin composition that has been cured by said ionizing radiation, and that the resultant composite thus aligned is placed into a compressed state; and (6) A releasing mechanism for enabling said rigid plate to be released from the surface of said intaglio-rotating roll after a termination of said compressed state.

In this recessed and projected pattern-forming apparatus, by the term "ionizing radiation", it is meant a radiation which is capable of exciting air or molecules so as to turn them into an ionized state, such as UV ray, X-ray, electron beam, etc. Further, by the term "ionizing radiation-curable resin composition", it is meant a composition containing a resin which is capable of taking place a curing reaction as it is irradiated with an ionizing radiation.

By the term "releasable surface", it is meant a surface which enables a cured product of an ionizing radiation-curable resin composition to be very easily released from a mold. For example, this surface may be constituted by silicone resin, fluororesin, polyolefin resin or polyester resin. These resins can be formed on the surface of an intaglio. Actually, a metallic plate formed of aluminum, stainless steal, Invar alloy; or plastic film formed of polyester resin, etc. can be employed as a substrate plate, on the surface of which a recessed pattern of the aforementioned releasable material can be formed.

As for the method of preparing the aforementioned intaglio, it is possible to employ a lift-off method or a casting method using a matrix. This lift-off method is a method wherein a pattern inverted of a desired pattern is formed on the surface of a printing matter at first, and then, a releasable material is coated all over this inverted pattern and subsequently allowed to cure, after which the inverted pattern is finally peeled away from the printing matter to thereby obtain an aimed intaglio.

The thickness of the elastic layer which enables it to follow a rigid plate should be such that although it may differ depend on the non-uniformity in thickness (between lots, between substrates, or within the same substrate), the elastic layer is enabled to retain an elasticity thereof at least within the range of non-uniformity of thickness. A tolerable range of deformation of the recessed pattern is preferably: (tolerable range of non-uniformity of thickness)+(the thickness which is 2 to 5 times as large as the depth of recessed portion).

When expressed numerically, the thickness of the elastic layer should be 0.5 to 3 mm in the case of the substrate for the plasma display panel.

As for the method of turning the surface of intaglio into a releasable surface, there are two methods, i.e. a method of forming a recessed and projected pattern of silicon resin directly on the surface of intaglio-rotating roll; and a method wherein a recessed and projected pattern of silicon resin is formed on the surface of flexible substrate, and then, the resin pattern is wound up on the surface of intaglio-rotating roll. As for this winding method, it is possible to employ a method of adhering the resin pattern by making use of an adhesive or a self-adhesive; a method of sucking the resin pattern by using magnetic force, electric force or vacuum; or a method which is generally employed in a rotary printing machine. It is also possible to employ a method of holding the resin pattern by making use of a jig.

As for the kinds of the ionizing radiation-permeable film, it is possible to employ polyester, polyimide, etc. The thickness of this film should preferably be, in terms of handling, in the range of 30 to 100 μm. As for the releasable film to be formed on the surface of this film, it is preferable to employ silicone resin. A releasable film formed of polyester film coated on the surface thereof with silicone resin is available in the market, most of which being useful in the present invention.

As for the composition of the ionizing radiation-curable resin, it may differ depending on the end-use thereof. Followings are specific examples thereof. However, the viscosity and fluidity thereof should be such that enables the resin composition to be filled in the intaglio.

Figure 32:
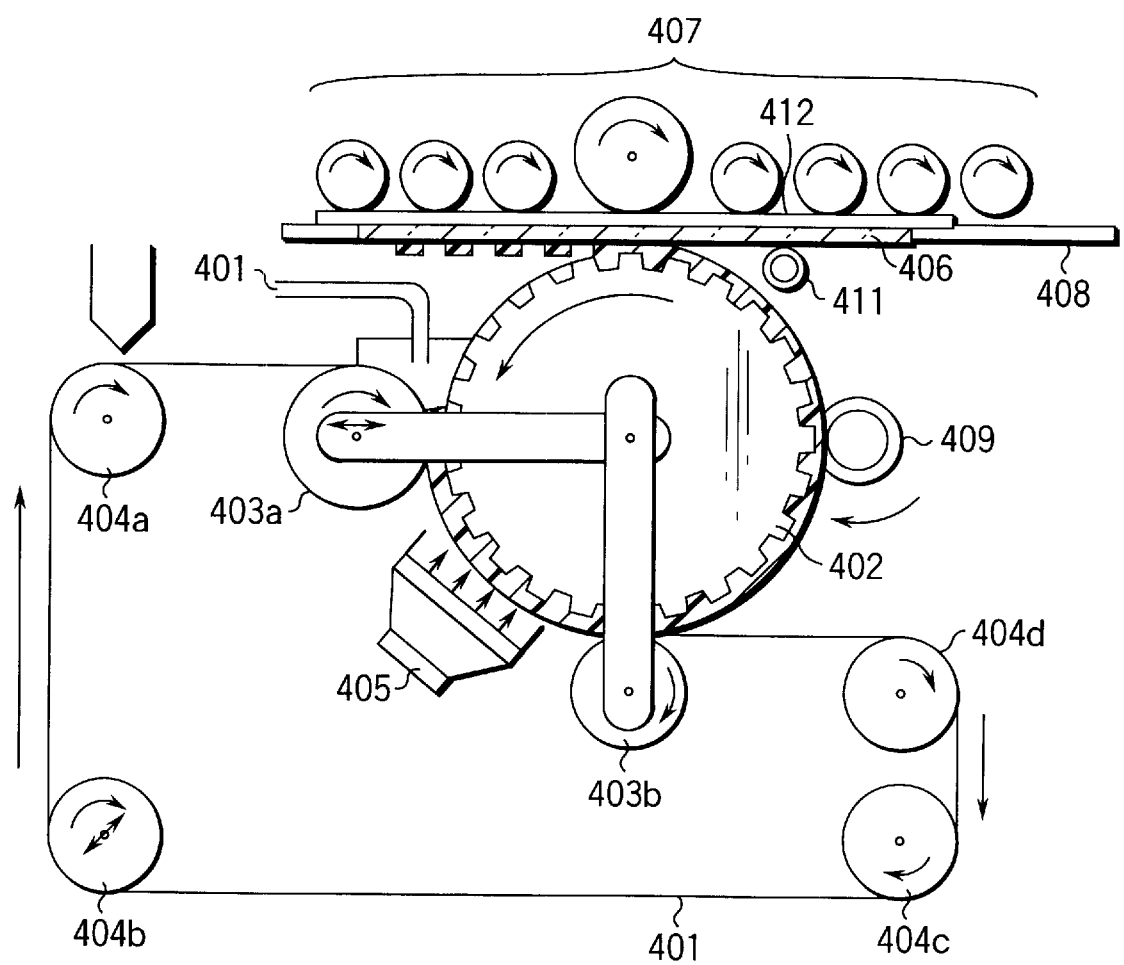
FIG. 32 is a drawing illustrating a recessed and projected pattern-forming apparatus according to a fourth aspect of the present invention.

As for the pinching mechanism for enabling the ionizing radiation-curable resin composition to be continuously pinched while keeping a predetermined thickness thereof, a mechanism shown in FIG. 32 can be employed in general. Namely, it is realized by providing a pair of back-up rolls 403*a* and 403*b* at a region where the film 401 and the intaglio-rotating roll 402 begin to engage with each other, and at a region where the film 401 and the intaglio-rotating roll 402 begin to be disengaged from each other, respectively. In this case, the provision of tension control rolls 404*a* to 404*d* are required for the adjustment of the tension of the film 401.

As for the specific embodiment of the mechanism 405 for irradiating an ionizing radiation under the condition where the resin composition is kept pinched, it is possible to employ a UV irradiation device which is desirably capable of irradiating radiation which is uniform in luminance in the lateral direction of the intaglio-rotating roll. For example, a UV irradiation device which is installed in an offset printing machine using a UV-curable ink, or a non-polarized UV irradiation device which is available from Fusion Co., Ltd. can be preferably employed.

As for the arrangement of the UV irradiation device, that shown in FIG. 32 can be generally employed.

As for the mechanism for releasing the ionizing radiation-permeable film 401 from the surface of the intaglio-rotating roll 402 after finishing the curing of the film 401, a mechanism employing a pair of back-up rolls 403*a* and 403*b* can be used in general.

Where an accurate alignment is required, it is possible to employ a mechanism 407 which is constructed such that a rigid plate 406 is fed over the intaglio-rotating roll 402 for enabling the rigid plate 406 to be superimposed and aligned, at a predetermined precision, with the ionizing radiation-curable resin composition that has been cured by the ionizing radiation, and that the resultant composite thus aligned is placed into a compressed state.

As for the mechanism for enabling the rigid plate 406 to be released from the surface of the intaglio-rotating roll 402 after the termination of the compressed state, a guide rail 408 can be generally employed.

As for the releasable surface agent for the intaglio-rotating roll, silicone resin can be employed. As for the kind of silicone resin to be employed in this case, room temperature curing rubber which is adapted for use in templating is most preferable, because it can be formed into an intaglio by introducing it into a matrix and curing it subsequently. For example, room temperature curing silicone rubber (TSE3540; Toshiba Silicone Co., Ltd.) which has been employed in the manufacture of decorative plywood as described in the aforementioned paragraph related to the prior art is preferable for use in the present invention. However, it is also possible to employ other kinds of room temperature curing rubber, or a millable silicone rubber. What should be taken into mind in this case is that the rubber can be hardly swelled by an ionizing radiation-curable resin composition to be employed.

It is possible to preliminarily apply an adhesive or a self-adhesive to the surface of rigid plate to be transferred over the intaglio-rotating roll. If this self-adhesive is applied all over the surface of rigid plate, the adhesivity will be left remained even in the region other than the region where the projected pattern that has been transferred. Unless this adhesivity is consumed for any other purposes to thereby eliminate this adhesivity, the presence of this adhesive region would bring about a problem such as the adhesion of rubber to this region. In view of overcoming this problem, the employment of a self-adhesive which can be cured by means of ultraviolet rays is preferable.

As a chemical composition, there is known a UV-curable adhesive. In the case of adhesive, treatments thereof such as heating, the spraying of solvent, etc. are required to be performed so as to provide it with a sufficient adhesivity to pull out a cured product of the ionizing radiation-curable resin composition from the intaglio.

A transferring resin may be coated on the surface of the cured resin composition. In this case, a roll-coating mechanism 409 as shown in FIG. 32 can be employed for instance. This transferring resin composition is incapable of adhering onto silicon rubber, but is capable of adhering onto only the region where the ionizing radiation-curable resin composition has been cured. As for the kinds of transferring resin, those mentioned above as being useful for the transferring can be employed.

The width of the ionizing radiation-permeable film may be larger than the width of the intaglio-rotating roll. It is preferable, in view of handling, to employ an ionizing radiation-permeable film which is wider than that of the intaglio-rotating roll by a dimension of about 5 cm to 15 cm. If it is constructed such that the portion of the ionizing radiation-curable resin composition that has been placed on this laterally extended portion is prevented from being irradiated by an ionizing radiation, this portion of the ionizing radiation-curable resin composition can be recovered for re-use.

It is also possible to preliminarily coat the ionizing radiation-curable resin composition on the surface of the ionizing radiation-permeable film having a releasability before the ionizing radiation-permeable film is fed to the irradiation apparatus. The purpose of this preliminarily coating of the ionizing radiation-curable resin composition is to prevent the entrapment of air bubbles and to feed an appropriate quantity of paste.

As for the coating method to be employed in this case, any of roll coating, die coating and knife coating can be preferably employed. In the employment of these coating methods, it is more preferable to employ a method to directly coat the ionizing radiation-curable resin composition that has been vacuum-degassed. As for the method of preventing the entrapment of air bubbles in an interface between the film and the paste on the occasion of coating a paste of high viscosity, it is preferable to employ a method wherein a liquid layer of low viscosity is coated thin on the surface of the film before the paste of high viscosity is coated. As for the liquid of low viscosity, water can be employed.

The quantity of paste to be coated should be adjusted so as to minimize the quantity of paste that may be squeezed out over the opposite sides of the ionizing radiation-permeable film.

It is also possible to preliminarily coat a self-adhesive or an adhesive on the surface of the ionizing radiation-permeable film having a releasability. The purpose of this preliminarily coating is to omit the coating of a self-adhesive or an adhesive on the surface of the rigid plate. The ionizing radiation-curable resin composition may be further coated over the layer of self-adhesive or adhesive. In this case, if the layer of self-adhesive or adhesive is liquid, the entrapment of air bubbles at the interface can be prevented. As for the coating method to be employed in this case, any of roll coating, die coating and knife coating can be preferably employed. After this coating, the solvent can be removed through drying, or ultraviolet ray may be irradiated so as to enhance the adhesive strength.

A mechanism 410 for feeding liquid may be disposed at a region where the intaglio-rotating roll and the ionizing radiation-curable resin composition begin to contact with each other. The purpose of this is to prevent the entrapment of air bubbles at this portion. As for the kind of liquid to be employed in this case, it is selected from those which do not cause the expansion or dissolution of the surface of intaglio. This liquid may be such that, however, may expand or dissolve more or less the ionizing radiation-curable resin composition. There is an occasion where the employment of such a kind of liquid is rather preferable. Actually, the liquid may be selected from water, an aqueous solution containing methyl alcohol, ethyl alcohol or isopropyl alcohol, or alcohols.

A mechanism 411 for feeding liquid may be disposed at a region where the intaglio-rotating roll and the rigid plate begin to contact with each other. The purpose of this is the same as that of the mechanism for feeding liquid at a region where the intaglio-rotating roll and the ionizing radiation-curable resin composition begin to contact with each other. However, depending on the kinds of the rigid plate, the liquid may be fed in a film-like form to the rigid plate, the rigid plate being subsequently superimposed with the intaglio.

The shifting mechanism may be constituted by an X-Y-θ table having a mechanism 412 for securing the rigid plate and designed to be moved following a guide rail 408. In this case, the rigid plate is required to be lifted upward, so that the X-Y-θ table should preferably be provided with a mechanism of vacuum suction. As for the kinds of guide rail, the employment of a linear guide is preferable. For the purpose of shifting the rigid plate, a driving force such as a ball screw, an air slider, etc. can be employed. The precision may be more or less deteriorated though, it is also possible to employ a timing belt.

As a method of forming a recessed and projected pattern having a mechanism of shifting the rigid plate, it is possible to employ a method wherein an alignment mark is attached to both of the intaglio and the rigid plate, thereby making it possible to transfer the alignment mark of the intaglio to the rigid plate, and to measure any misregistration between the alignment mark of the intaglio that has been transferred to the rigid plate and the alignment mark of the rigid plate, thereby enabling the position of the X-Y-θ table holding the rigid plate to be adjusted correspondingly so as to perform the alignment between the intaglio and the rigid plate.

Among the alignment marks which are to be attached to corresponding portions of both of the intaglio and the rigid plate, the alignment mark to be attached to the intaglio is such that can be transferred to the rigid plate. More specifically, the alignment mark should preferably be such that can be formed in the same step for forming a desired recessed pattern.

The material for filling the recessed portion of alignment mark may be an ionizing radiation-curable resin composition, which should preferably be transferred after the curing thereof in order to make it more stable in configuration. However, since it is important to clearly retain the plane configuration of the alignment mark, only the alignment mark portions may be separately formed using a waterless offset printing plate for instance.

The ionizing radiation-curable resin composition may be selected from those which are suited for forming a fine pattern and have a color which is suited for the measurement thereof.

The alignment is performed by a method wherein the alignment mark of the intaglio is transferred in advance to the rigid plate, and any misregistration between the alignment mark of the intaglio that has been transferred to the rigid plate and the alignment mark of the rigid plate, thereby enabling the position of the X-Y-θ table holding the rigid plate to be adjusted correspondingly so as to perform the alignment between the intaglio and the rigid plate.

As for the rigid substrate to be employed in this fourth aspect of the present invention, it is possible to employ a glass plate or a print circuit-like substrate, both of which may be preliminarily treated so as to provide the rigid substrate with a preliminary coat or pattern.

The entrapment of air bubbles can be completely prevented by sealing the substrate with liquid. In this case, an intaglio of rotary system is structurally very advantageous. It becomes possible, due to the employment of a releasable film, to leave a cured resin on the intaglio after the curing of resin through the irradiation of ionizing radiation. Although a self-adhesive is employed for the transferring of cured resin, since the surface of intaglio is formed of silicone rubber, there is little possibility that the adhesive can adhere to the silicone rubber, thereby making it possible to transfer the adhesive together with the cured resin.

Next, examples according to the fourth aspect of the present invention will be explained with reference to the drawings.

EXAMPLE 20

This example describes the manufacture of barrier ribs of the back substrate of plasma display.

This apparatus has the following features.

(1) Intaglio-rotating roll having a diameter of 300 mm and a width of 1000 mm. An intaglio winding set system.

(2) The employment of head of slot coater as a device for coating a barrier rib paste on the surface of releasable film.

(3) Ionizing radiation irradiating device→a UV irradiation device (Fusion Co., Ltd.; 5 kW type; light-shielding wall-attached device for preventing a region other than a predetermined region from being irradiated).

(4) The X-Y-θ table is provided with a vacuum suction device, with an alignment mark position-detecting mechanism, with a set position automatic correcting mechanism (based on data from the detecting mechanism), and with a position offset function. Alignment accuracy: ±3 µm.

(5) Glass substrate-shifting transferring mechanism: A belt mechanism for receiving and securing a glass substrate that has been set in position by the glass substrate position-setting X-Y-θ table (comprising a shifting belt and a table secured on the belt, wherein the table is provided with a function which is capable of securing or releasing the glass substrate), and for passing the transfer portion of the glass substrate to the receiving portion, at which the securing of the glass substrate is released.

The portion to be treated is shifted following the linear guide. A gear/chain mechanism is provided wherein the driving force is set in such a manner that the intaglio-rotating roll and the belt are both moved at the same speed. A back-up roll which is capable of applying a predetermined pressure is installed at the transferring position. Since the precision specification on the pitch between the electrode and the barrier rib is ±5 µm, and the precision specification on the transfer-initiating position is ±100 µm or so, the meandering of the belt in the lateral direction thereof is strictly prohibited. As a result, a required portion of the belt is allowed to move, following the linear guide.

Materials employed:
(1) Releasable film: Polyester film 30 µm in thickness and having thereon a silicone resin-based releasable coating.
(2) Liquid to be fed to an air-bubble entrapment preventive mechanism is water.
(3) Rigid plate: Glass substrate for plasma display panel (PD-200; Asahi Glass Co., Ltd.; 850 mm×650 mm (for 4:3 type 40-inch panel), 3 mm in thickness; provided with electrodes and alignment marks; a self-adhesive (acrylic resin, 50 µm in thickness) coated on a desired transferring region; and a protective film laminated).
(4) Intaglio: For a plane intaglio-winding system→substrate 42 alloy; 300 µm in thickness.

Silicone rubber of intaglio: For room temperature curable templating (Toshiba Silicone Co., Ltd.; TSE 3540); a cast article 2 mm in thickness; alignment marks on TAP plate; a rubber plate employed for an underlying plate (0.5 mm in thickness); barrier rib 70 µm in width, 180 µm in height and 430 µm in pitch. By the way, the direction of barrier rib is set in a direction parallel with the rotating direction of intaglio. Because it becomes possible, in this way, to facilitate the filling of paste into the recessed portions, to minimize the entrapment of air bubbles, to facilitate the transferring, and to quite easily secure the accuracy of positioning.
(5) UV-ray curable paste for barrier rib: The composition thereof is shown in the following Table 1.

TABLE 1

| Lead borosilicate glass frit: | 68 parts by weight |
| Alumina: | 12 parts by weight |
| Ethylene oxide-added sorbitol hexaacrylate (n = 15): | 8 parts by weight |
| Polyethylene glycol #400: | 8 parts by weight |
| t-butyl anthraquinone: | 2 parts by weight |
| Butylbenzyl phthalate: | 2 parts by weight |

The UV-ray curable paste for barrier rib which was vacuum degassed was fed under pressure to the head of slot coater, thus allowing the paste to be placed and coated on the surface of a releasable film. The thickness of the paste was 80 µm which corresponded to the quantity of paste to be pinched between rolls. The gap between the pinching roll and the intaglio rotating roll was set to 50 µm by means of a gap control mechanism.

Further, by making use of a releasable film tension control roll, the tension of the releasable film was set to 0.5 kg/cm². This magnitude of tension was determined through experiment as being suited for controlling the thickness of the pasted to be pinched to 50 µm. The speed of pinching, i.e. peripheral speed of the intaglio was set to 5 cm/sec.

The exposure dose of UV-ray was 1000 mJ. The pressure of the back-up roll for laminating the film with the rigid plate was 2 kg/cm. By the way, the protective film placed on the rigid plate was peeled away immediately before this lamination so as to minimize the adhesion of dusts. The liquid employed was water, and the method of feeding water was a spraying method.

The method of alignment:
(1) A spare substrate is set in such a manner that the alignment mark which is formed simultaneous with the formation of the electrodes (referred to hereinafter as electrode alignment mark) can be placed inside the visual field of a CCD observation system, this alignment mark being determined as a provisional origin.
(2) Under this condition, the transferring is initiated. Namely, while the substrate is kept vacuum-sucked onto the X-Y-θ table, the substrate is secured to the shifting belt (at this moment, the shifting belt is made stationary), then, the vacuum suction by the X-Y-θ table is released, after which the table is lifted up 1 to 2 mm by means of compressed air. Then, the belt is initiated to move so as to permit the glass substrate to pass through the transferring region to the substrate-receiving zone. As a result, the barrier rib alignment mark is transferred to the spare substrate.
(3) This spare substrate is permitted to return to the start position, and any misregistration between the electrode alignment mark (provisional origin) and the barrier rib alignment mark (true origin) is measured, thus making it possible to set the magnitude of offset for shifting the provisional origin to the true origin every time.
(4) A production substrate is set in place. In this mechanism, the electrode alignment mark is detected at first, and the electrode alignment mark thus detected is shifted to the provisional origin. Then, this provisional origin is shifted by a distance corresponding to the magnitude of offset. As a result, the true origin (barrier rib alignment mark) is superimposed on the electrode alignment mark.
(5) Under this condition, in the same manner as on the occasion of the spare substrate, the production substrate is secured to the transferring belt and allowed pass through the transferring step to thereby transfer the barrier ribs onto a predetermined position.
(6) Thereafter, the feeding of production substrates is repeated.

Post treatment:
The cured paste detached from the roll may be left adhered onto a region of the substrate which is not coated with an adhesive even after the transferring step. This residual paste is peeled away by making use of a dust-removing adhesive roll.
(2) Thereafter, the sintering of the paste is performed.

Results:
Configuration: The barrier ribs thus formed were the same as the configuration of the intaglio, except that the thickness of the dielectric portion was 10±20 µm.
Defects: Defects in the barrier ribs or other regions due to the entrapment of air bubbles, insufficient filling, incomplete transferring were not recognized.
Alignment accuracy relative to the electrodes: ±20 µm in a direction parallel with the transferring direction; ±5 µm or less in a direction perpendicular to the transferring direction; and the meandering of barrier ribs being ±5 µm based on R.

By the way, the device and method of this embodiment are also applicable for the manufacture of the barrier ribs of the back plate of plasma addressed liquid crystal display (PALC). It is also possible to apply the present invention to the formation of the paste wiring and electrodes of PDP and PALC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a plasma display panel, which comprises:

filling an ultraviolet-curing barrier rib-forming paste containing glass frit in a barrier ribs-forming intaglio;

irradiating ultraviolet rays onto an entire surface of the barrier rib-forming paste to cure the barrier rib-forming paste;

superimposing a substrate on the barrier ribs-forming intaglio filled with the barrier rib-forming paste containing glass frit to thereby transfer the barrier rib-forming paste onto the substrate; and heating the barrier rib-forming paste that has been transferred to the substrate, thereby burning out existing organic components and concurrently sintering the glass frit to thereby form the barrier ribs and dielectric layer, wherein the filling of the barrier rib-forming paste is performed, concurrently enabling the dielectric layer having a predetermined thickness to be formed on the intaglio, and the superimposing of the substrate on the barrier ribs-forming intaglio filled with the barrier rib-forming paste is performed, concurrently enabling the dielectric layer to be transferred onto the substrate.

2. The method of manufacturing a plasma display panel according to claim 1, wherein the filling of the barrier rib-forming paste containing glass frit in the barrier ribs-forming intaglio is performed, concurrently enabling the dielectric layer having a thickness of 5 to 20 $\mu$m after sintering thereof to be formed on the intaglio.

3. The method of manufacturing a plasma display panel according to claim 1, wherein the superimposing of the substrate on the barrier ribs-forming intaglio filled with the barrier rib-forming paste is performed using an adhesive material interposed therebetween.

4. The method of manufacturing a plasma display panel according to claim 1, wherein the barrier ribs-forming intaglio is formed of silicone rubber.

5. The method of manufacturing a plasma display panel according to claim 1, wherein the barrier ribs-forming intaglio comprises silicone intaglio and a 42-6 alloy plate laminated thereto.

6. The method of manufacturing a plasma display panel according to claim 5, wherein the substrate is a glass substrate.

7. The method of manufacturing a plasma display panel according to claim 1, wherein the substrate is a glass substrate.

8. The method of manufacturing a plasma display panel according to claim 1, wherein the filling of the ultraviolet-curing barrier rib-forming paste containing glass frit in the barrier ribs-forming intaglio is performed using a roll press.

9. The method of manufacturing a plasma display panel according to claim 1, wherein the filling of the ultraviolet-curing barrier rib-forming paste containing glass frit in a barrier ribs-forming intaglio is performed to pinch the ultraviolet-curing barrier rib-forming paste between the barrier ribs-forming intaglio and an ultraviolet ray-permeable releasable film.

\* \* \* \* \*